United States Patent
Kawasaki

(10) Patent No.: US 9,244,515 B2
(45) Date of Patent: Jan. 26, 2016

(54) SEMICONDUCTOR DEVICE COMPRISING DELAY MONITOR AND DISCRETE SUPPLY SWITCHES

(71) Applicant: FUJITSU LIMITED, Kawasaki-shi, Kanagawa (JP)

(72) Inventor: Kenichi Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 427 days.

(21) Appl. No.: 13/927,999

(22) Filed: Jun. 26, 2013

(65) Prior Publication Data

US 2014/0070879 A1 Mar. 13, 2014

(30) Foreign Application Priority Data

Sep. 13, 2012 (JP) .................................. 2012-201939

(51) Int. Cl.
G06F 1/32 (2006.01)
G06F 1/26 (2006.01)

(52) U.S. Cl.
CPC ............. *G06F 1/3203* (2013.01); *G06F 1/263* (2013.01); *G06F 1/324* (2013.01); *G06F 1/3296* (2013.01); *Y02B 60/1217* (2013.01); *Y02B 60/1285* (2013.01)

(58) Field of Classification Search
None
See application file for complete search history.

(56) References Cited

U.S. PATENT DOCUMENTS

| 8,368,457 | B2 | 2/2013 | Ikenaga | |
| 2002/0190283 | A1* | 12/2002 | Seno | ............... G06F 1/10 257/275 |
| 2003/0080802 | A1* | 5/2003 | Ono | ............... H03K 19/00384 327/534 |
| 2011/0068859 | A1* | 3/2011 | Nakai | ............... H02M 3/156 327/540 |

FOREIGN PATENT DOCUMENTS

| JP | 11-202958 | 7/1999 |
| JP | 2010-256026 | 11/2010 |
| JP | 2011-066791 | 3/2011 |

OTHER PUBLICATIONS

Yasuyuki Okuma, et al., "0.5-V Input Digital LDO with 98.7% Current Efficiency and 2.7-μA Quiescent Current in 65nm CMOS", IEEE, Sep. 19-22, 2010.

Koji Hirairi, et al., "13% Power Reduction in 16b Integer Unit in 40nm CMOS by Adaptive Power Supply Voltage Control with Parity-Based Error Prediction and Detection (PEPD) and Fully Integrated Digital LDO", IEEE, Feb. 19-23, 2012.

* cited by examiner

*Primary Examiner* — Jared Fureman
*Assistant Examiner* — Aqeel Bukhari
(74) *Attorney, Agent, or Firm* — Fujitsu Patent Center

(57) ABSTRACT

A semiconductor device includes: a plurality of circuit parts; a global power source; a plurality of power source supply circuits; and a plurality of local power source control circuits provided in correspondence to the plurality of circuit parts, wherein each of the plurality of power source supply circuits includes a plurality of discrete supply switches, each of the plurality of local power source control circuits includes: a delay monitor circuit having a delay path whose amount of delay changes in accordance with a change in the voltage value of the local power source, and whose output logical value changes in accordance with the amount of delay of the delay path; and a switch control circuit configured to control the number of the plurality of discrete supply switches based on the output logical value of the delay monitor circuit.

10 Claims, 29 Drawing Sheets

| LOAD | CLOCK FREQUENCY | SUPPLY VOLTAGE |
|---|---|---|
| HIGH LOAD | 400MHz | 1.2V |
| MEDIUM LOAD | 200MHz | |
| LOW LOAD | 100MHz | |
| NO LOAD | 0MHz | |

| LOAD | CLOCK FREQUENCY | SUPPLY VOLTAGE |
|---|---|---|
| HIGH LOAD | 400MHz | 1.2V |
| MEDIUM LOAD | 200MHz | 1.0V |
| LOW LOAD | 100MHz | 0.8V |
| NO LOAD | 0MHz | ~0V |

ENOR TRUTH TABLE

| sd0 | nd0 | war |
|-----|-----|-----|
| 0 | 0 | 1 |
| 0 | 1 | 0 |
| 1 | 0 | 0 |
| 1 | 1 | 1 |

※IF DATA AGREES, 1 IS OUTPUT
AND IF NOT, 0 IS OUTPUT

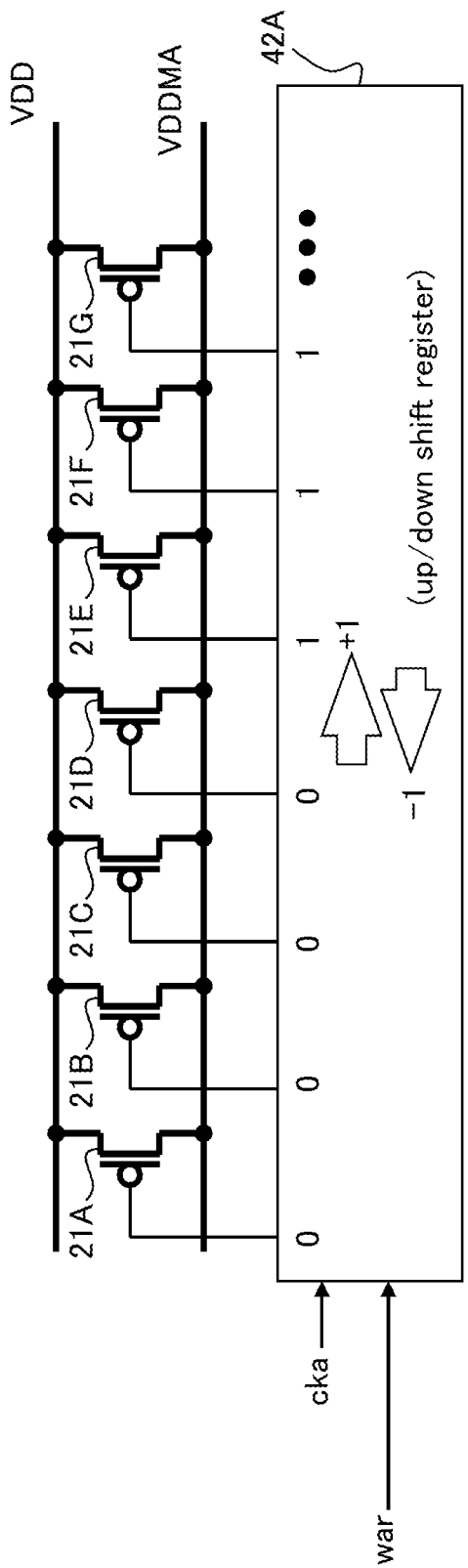

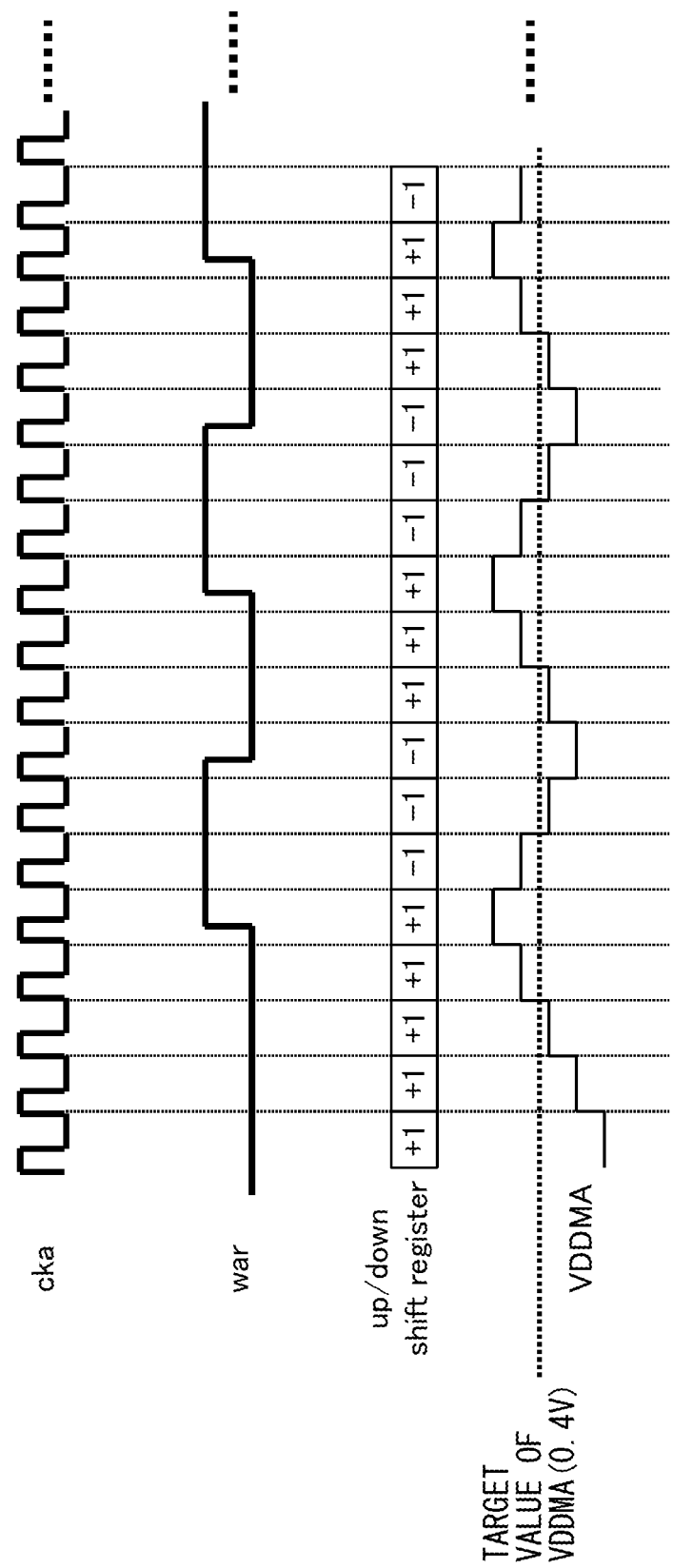

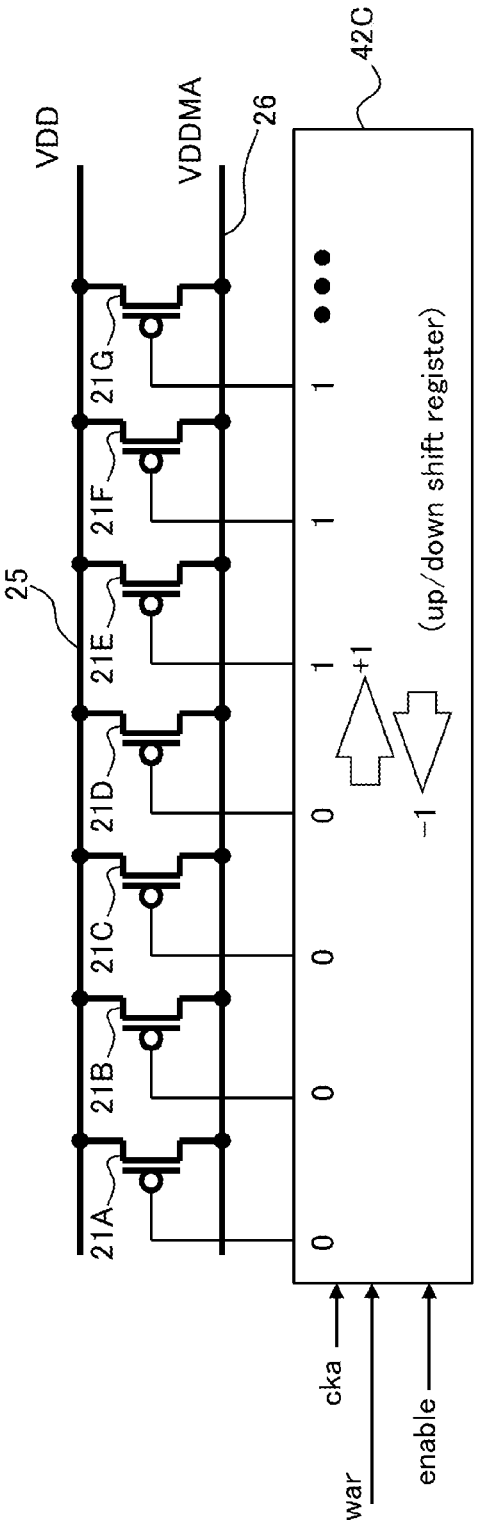

| enable | war | OPERATION |
|---|---|---|
| 1 | 0 | +1 EACH TIME OF INPUT OF cka "H" (NUMBER OF SUPPLY TRANSISTORS TO BE TURNED ON IS INCREASED BY ONE) |
| 1 | 1 | −1 EACH TIME OF INPUT OF cka "H" (NUMBER OF SUPPLY TRANSISTORS TO BE TURNED ON IS DECREASED BY ONE) |
| 0 | × | ALL RESET TO "1" (POWER GATING: ALL SUPPLY TRANSISTORS ARE TURNED OFF) |
| 0⇒1 | × | ONLY AT THE TIME OF TRANSITION FROM 0 TO 1, ALL RESET TO "0" (ALL SUPPLY TRANSISTORS ARE TURNED ON) |

SEMICONDUCTOR DEVICE COMPRISING DELAY MONITOR AND DISCRETE SUPPLY SWITCHES

CROSS-REFERENCE TO RELATED APPLICATION

This application is based upon and claims the benefit of priority of the prior Japanese Patent Application No. 2012-201939, filed on Sep. 13, 2012, the entire contents of which are incorporated herein by reference.

FIELD

The disclosed techniques relate to a semiconductor device.

BACKGROUND

In recent years, the demand for a reduction in power consumption in a semiconductor device (LSI) is increasing more and more. The interior of an LSI is divided into a plurality of circuit parts (circuit blocks), and power consumption of a circuit whose load is lightened is reduced by reducing the operation frequency.

FIG. 1A is a diagram illustrating a schematic configuration of an LSI in which an operation frequency for each circuit part is changed, and FIG. 1B is a diagram illustrating a time chart indicating the operation of the LSI illustrated in FIG. 1A.

As illustrated in FIG. 1A, an LSI 10 has a plurality of circuit blocks including a first circuit block 11A and a second circuit block 11B, and a power management unit (PMU) 12. The PMU 12 supplies a clock "cka" to the first circuit block 11A and a clock "ckb" to the second circuit block 11B. The PMU 12 divides a system clock "clk" to generate an operation clock and changes the clocks "cka" and "ckb" to be supplied to each circuit block in accordance with a clock mode specified in correspondence to the load state of each circuit block. In this manner, the PMU 12 controls each circuit so as to reduce power consumption while maintaining a desired processing speed.

FIG. 1B illustrates an example of the change in the operation state of the first circuit block 11A. For example, the first circuit block 11A operates at an operation frequency of 100 to 400 MHz, and operates at an operation frequency of 400 MHz in the high-load state where a large amount of data is processed within a brief time and operates at an operation frequency of 100 MHz in the low-load state where a small amount of data is processed within a comparatively long time. In other words, the frequency of the clock "cka" to be supplied to the first circuit block 11A is high when the load is high, and low when the load is low. The power consumption of the first circuit block 11A is larger at the time of operation at 400 MHz than that at the time of operation at 100 MHz.

Similarly, the second circuit block 11B operates at an operation frequency of 50 to 200 MHz in accordance with its load.

The LSI illustrated in FIG. 1A and FIG. 1B changes the frequency of the clock to be supplied to each circuit block, however, the power source voltage supplied to each circuit block is fixed (1.2 V in FIG. 1B).

The power consumption of the circuit block changes in accordance with the operation frequency, however, also changes in accordance with the supplied power source voltage. Therefore, a technique in which power is reduced by reducing not only the operation frequency but also the supply voltage positively in accordance with the load state of the circuit block has been adopted in many cases. Such a technique is referred to as the DVFS (Dynamic Voltage and Frequency Scaling) technique.

FIG. 2A is a diagram illustrating a schematic configuration of the LSI to which the DVFS technique is applied. FIG. 2B is a diagram illustrating a time chart indicating an operation of the LSI illustrated in FIG. 2A.

As illustrated in FIG. 2A, the LSI 10 has a plurality of circuit blocks including the first circuit block 11A and the second circuit block 11B, the PMU 12, and a VREF generation circuit 16.

The first circuit block 11A has an LDO (Low Drop Out) regulator 15A. The second circuit block 11B has an LDO regulator 15B. The VREF generation circuit 16 generates a reference potential VREF to be supplied to the LDO regulators 15A and 15B. The PMU 12 supplies the clock "cka" to the first circuit block 11A and also supplies a control signal "ca" of the supply voltage to the LDO regulator 15A. Further, the PMU 12 supplies the clock "ckb" to the second circuit block 11B and also supplies a control signal "cb" of the supply voltage to the LDO regulator 15B. The PMU 12 changes the frequency of the clock to be supplied and the voltage to be supplied in accordance with the load state of each circuit block specified by the DVFS mode from outside and controls each circuit block so as to reduce power consumption while maintaining the desired processing speed.

When the DVFS technique is applied, if the power source voltage is applied to each circuit block from the outside of the LSI, the number of parts other than the LSI increases, resulting in an increase in the cost. Therefore, a mechanism as illustrated in FIG. 2A is generally adopted, in which the LDO regulator is mounted in correspondence to the circuit block inside the LSI 10, and a single external power source is used, and various voltages are generated inside the LSI to supply a desired voltage to each circuit.

FIG. 2B illustrates an example of the change in the operation state of the first circuit block 11A. For example, the first circuit block 11A operates at an operation frequency of 100 to 400 MHz and on a supply voltage of 0.8 V to 1.2 V. The first circuit block 11A operates on a supply voltage of 1.2 V and at an operation frequency of 400 MHz in the high-load state, and operates on a supply voltage of 0.8 V and at an operation frequency of 100 MHz in the low-load state.

Similarly, the second circuit block 11B operates at an operation frequency of 50 to 200 MHz and on a supply voltage of 0.8 V to 1.2 V in accordance with its load.

Consequently, the PMU 12 outputs a control signal of the frequency of the clock to be supplied to each circuit block and the supply voltage in accordance with the DVFS mode indicating the load state of each circuit block specified from outside. Specifically, the PMU 12 supplies the "cka" of 400 MHz when the first circuit block 11A is in the high-load state and also supplies the "ca" to control the LDO regulator 15A so as to set the supply voltage to 1.2 V. Further, the PMU 12 supplies the "cka" of 100 MHz when the first circuit block 11A is in the low-load state and also supplies the "ca" to control the LDO regulator 15A so as to set the supply voltage to 0.8 V. This also applies to the second circuit block 11B.

In FIG. 2B, the broken line indicates a case where the supply voltage is kept at 1.2 V in the low-load state and by changing the supply voltage from 1.2 V to 0.8 V at the time of the low-load state, the power consumption is reduced by 33% compared to the case of 1.2 V.

FIG. 3A to FIG. 3C are diagrams illustrating the changes in the clock frequency and in the supply voltage in accordance with the load of the first circuit block 11A of the LSI, in which only the clock frequency is changed as illustrated in FIG. 1A and FIG. 1B and the DVFS technique is applied.

As illustrated in FIG. 3A, when only the clock frequency is changed as in FIG. 1A and FIG. 1B, the supply voltage is fixed at 1.2 V and the desired minimum clock frequency by which the first circuit block 11A can process its load is allocated for each clock mode as in FIG. 3A. The PMU 12 changes the frequency of the clock to be supplied to the first circuit block 11A in accordance with the clock mode corresponding to the load. Specifically, the PMU 12 changes the clock frequency to 400 MHz when the load is high, to 200 MHz when the load is medium, to 100 MHz when the load is low, and to 0 MHz when there is no load (i.e., the clock is not supplied).

When the DVFS technique is applied, the frequency of the clock to be supplied to the first circuit block 11A is changed in accordance with the DVFS mode corresponding to the load, and also the LDO regulator 15A is controlled to change the supply voltage. Therefore, as illustrated in FIG. 3B, the desired minimum supply voltage value by which the first circuit block 11A can operate at each clock frequency is allocated for each DVFS mode. That is, a combination of the clock frequency and the supply voltage is set for each DVFS mode so that the power can be reduced in total in accordance with the change in the load state of the first circuit block 11A. Specifically, the clock frequency is changed to 400 MHz when the load is high, to 200 MHz when the load is medium, to 100 MHz when the load is low, and to 0 MHz when there is no load (i.e., the clock is not supplied). The supply voltage is changed to 1.2 V when the load is high, to 1.0 V when the load is medium, to 0.8 V when the load is low, and to 0.8 V or less when there is no load.

FIG. 3C is a diagram illustrating control points by the above-mentioned control in the coordinate system in which the horizontal axis represents the clock frequency and the vertical axis represents the supply voltage, wherein black circles indicate the case where only the clock frequency is changed in FIG. 3A, and white circles indicate the case where the DVFS technique in FIG. 3B is applied. A range surrounded by a solid line indicates a range in which the circuit can operate.

In the operable range of the circuit in FIG. 3C, the closer to the boundary line of the lower limit, the smaller the power consumption is. Therefore, in order to reduce the power consumption, it is desirable to control so that the control point becomes closer to the lower limit of the operable range. In the case where the supply voltage is fixed at 1.2 V in FIG. 3A, the control point is close to the lower limit of the operable range when the clock frequency is 400 MHz, however, the control point becomes more distant from the lower limit of the operable range when the clock frequency is 200 MHz and 100 MHz.

In contrast, when the DVFS technique is applied, the supply voltage is 1.0 V when the clock frequency is 200 MHz the supply voltage is 0.8 V when the clock frequency is 100 MHz, and therefore, the control point becomes close to the lower limit of the operable range. In the state where there is no load, the supply voltage is set to 0 V and the clock frequency is set to 0 MHz, i.e., the state is brought about where no clock is supplied. This state is outside the operable range, however, no circuit block operates, and therefore, it does not cause any problem in particular.

As described above, in order to apply the DVFS technique, a mechanism is provided that generates various supply voltage values and supplies them to each circuit block, and the LDO regulators 15A and 15B change the supply voltage value in accordance with the control of the PMU 12.

In recent years, in order to further reduce power, a very low power source voltage, such as about 0.5 V, is applied in place of a high power source voltage, such as 1.2 V, which is applied from outside illustrated in FIG. 2A and FIG. 2B, and an LDO regulator that operates under such conditions is demanded.

FIG. 4A and FIG. 4B are diagrams illustrating circuit examples of the LDO regulator proposed hitherto, also illustrating together circuit blocks to which the power source voltage is supplied from the LDO regulator.

FIG. 4A is a circuit diagram of an analog type LDO regulator 20. For example, the first circuit block 11A in FIG. 2A corresponds to a circuit block 11 and the LDO regulator 15A corresponds to the analog type LDO regulator 20. The analog type LDO regulator 20 is illustrated as being provided outside in correspondence to the circuit block 11, however, it may be provided as a part of the circuit.

The analog type LDO regulator 15A has s supply transistor 21, a differential amplifier 22, and variable resistors 23 and 24. The supply transistor 21 is a PMOS transistor provided between a high-potential side global power source line 25 of a voltage VDD and a local power source line 26 of the circuit block 11, and an output GA of the differential amplifier 22 is applied to the gate thereof. The variable resistors 23 and 24 are connected in series between the local power source line 26 and a low-potential side power source line 27 of a voltage VSS (0 V) and form a variable voltage divider circuit configured to output a divided voltage of a voltage VDDMA of the local power source line 26 and the VSS. The resistance values of the variable resistors 23 and 24 differ in accordance with the DVFS mode. In other words, it is possible for the variable voltage divider circuit to change the resistance ratio in accordance with the DVFS mode. The differential amplifier 22 generates the output GA in accordance with a difference between a divided voltage MONA output from the variable voltage divider circuit and the reference potential VREF output from the VREF generation circuit 16 in FIG. 2A. Reference symbol "C" indicates a capacitor between the VDDMA and the VSS.

The differential amplifier 22 compares the divided voltage of the supply voltage VDDMA to the circuit block 11 and the VSS with the reference potential VREF, and determines whether or not the VDDMA is higher than the desired minimum voltage value (target value) for the circuit block 11 to operate by a potential comparison in an analog manner. Then, in accordance with the comparison result, if the VDDMA is lower than the target value, the output GA is controlled in an analog manner so that the amount of supply current of the supply transistor 21 is increased, and if the VDDMA is higher than the target value, the GA is controlled in an analog manner so that, on the contrary, the amount of supply current is reduced. Therefore, the VDDMA is kept at the target value at all times. The target value differs depending on the DVFS mode, and therefore, as described above, the resistance values of the variable resistors 23 and 24 are changed in accordance with the DVFS mode, and the resistance ratio of the variable voltage divider circuit can be changed. Consequently, it is possible for the LDO regulator 15A to dynamically change the supply voltage in order to keep the target value by changing the VDDMA toward the target value set for each DVFS mode.

The analog type LDO regulator is an LDO regulator widely used at present in the case where the power supply voltage VDD applied from outside is about 1.2 V.

However, in recent year, in order to further reduce power consumption, the power source voltage VDD is reduced to about 0.5 V and the VDDMA becomes about 0.4 V and the VREF is set to 0.25 V. If the VDD falls to as low as 0.5 V, it is difficult to perform gate potential control in an analog manner with precision because a threshold value of the transistor that forms the LDO regulator 15A is 0.4 V to 0.5 V, and therefore, the VDD enters a sub threshold region. The sub threshold region is a region in which the VDD becomes equal to or less than the threshold value.

Then, a digital type LDO regulator is proposed.

FIG. 4B is a circuit diagram of a digital type LDO regulator 30. FIG. 4B also illustrates together circuit blocks to which the power source voltage is supplied by the LDO regulator 30. For example, the first circuit block 11A in FIG. 2A corresponds to the circuit block 11 and the LDO regulator 15A corresponds to the digital type LDO 30. It may also be possible to provide the digital type LDO regulator 30 as part of the circuit block 11.

The basic configuration and operation of the digital type LDO regulator 30 are the same as those of the analog type LDO regulator 20 in FIG. 4A, however, the following points are different.

(1) The supply transistor 21 is formed by a plurality of supply transistors 21A, 21B, 21C, . . . connected in parallel.

(2) The differential amplifier 22 is replaced with a comparator 28 configured to output the comparison result as a digital value of 0 or 1.

(3) A controller 29 is provided that controls the turning on and off of the plurality of the supply transistors 21A, 21B, 21C, . . . in accordance with the output of the comparator 28.

If the VDDMA is lower than the target value, for example, the comparator 28 outputs "0" and the controller 29 performs control so as to increase the amount of supply current by increasing the number of the plurality of the turned-on supply transistors 21A, 21B, 21C, . . . . On the contrary, if the VDDMA is higher than the target value, the comparator 28 outputs "1" and the controller 29 performs control so as to reduce the amount of supply current by decreasing the number of the plurality of the turned-on supply transistors 21A, 21B, 21C, . . . .

By changing the control to the digital control as described above, the LDO regulator becomes to operate on a VDD level at which no erroneous operation of 0 or 1 does not occur, and therefore, the LDO regulator will operate accurately at the VDD lower than that of the analog type LDO regulator.

RELATED DOCUMENTS

[Patent Document 1] Japanese Laid Open Patent Document No. 2011-066791
[Non Patent Document 1] "0.5-V Input Digital LDO with 98.7% Current Efficiency and 2.7-μA Quiescent Current in 65 nm CMOS", Yasuyuki Okuma, et al., Custom Integrated Circuits Conference (CICC), Sep. 19-22, 2010
[Non Patent Document 3] "13% Power Reduction in 16b Integer Unit in 40 nm CMOS by Adaptive Power Supply Voltage Control with Parity-Based Error Prediction and Detection (PEPD) and Fully Integrated Digital LDO", Koji Hirairi, et al., International Solid-State Circuits Conference (ISSCC), Feb. 19-23, 2012

SUMMARY

According to an aspect of the embodiments, a semiconductor device includes: a plurality of circuit parts; a global power source configured to supply a power source voltage supplied from outside; a plurality of power source supply circuits configured to connect local power sources of the plurality of circuit parts and the global power source; and a plurality of local power source control circuits provided in correspondence to the plurality of circuit parts and configured to control the plurality of power source supply circuits so that voltage values of the local power sources of the plurality of circuit parts are desired values, wherein each of the plurality of power source supply circuits includes a plurality of discrete supply switches, each of the plurality of local power source control circuits includes: a delay monitor circuit having a delay path whose amount of delay changes in accordance with a change in the voltage value of the local power source, and whose output logical value changes in accordance with the amount of delay of the delay path; and a switch control circuit configured to control the number of the plurality of discrete supply switches based on the output logical value of the delay monitor circuit.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF THE DRAWINGS

FIG. 10A illustrates an example of the configuration of the controller, also illustrating together a plurality (here, seven) of supply transistors;

FIG. 10B is a diagram illustrating the operation of the controller;

FIG. 11 is a time chart illustrating the operation of the up/down shift register in FIG. 10A;

FIG. 17A is a diagram illustrating an example of the configuration of the controller in the third embodiment;

FIG. 17B is a diagram illustrating the operation of the controller;

DESCRIPTION OF EMBODIMENTS

Figure 5:
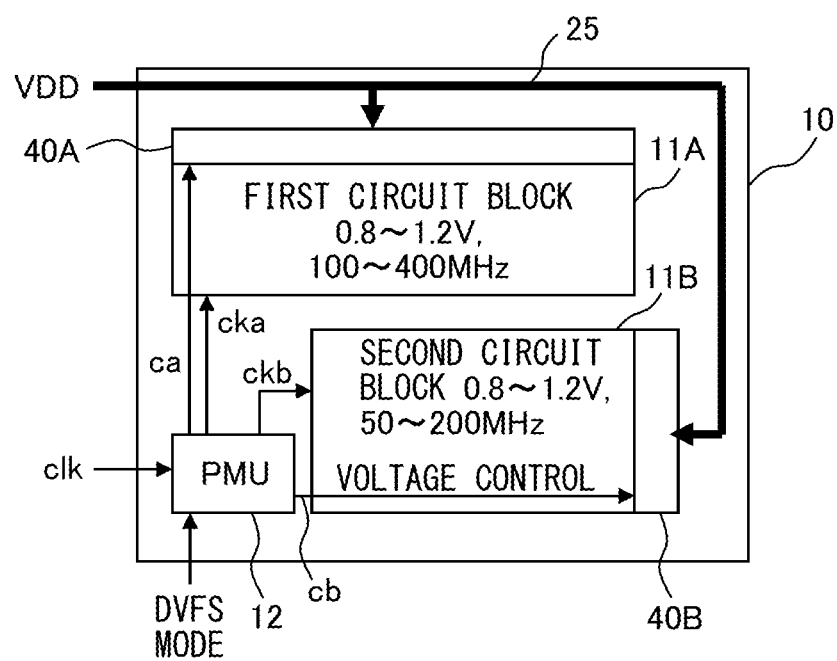
FIG. 5 is a diagram illustrating a schematic configuration of a semiconductor device (LSI) of a first embodiment.

FIG. 5 is a diagram illustrating the schematic configuration of a semiconductor device (LSI) of a first embodiment.

As illustrated in FIG. 5, the LSI 10 of the first embodiment has a plurality of circuit blocks including the first circuit block 11A and the second circuit block 11B, and the PMU 12.

The first circuit block 11A has a low drop out (LDO) regulator 40A. The second circuit block 11B has an LDO regulator 40B. The PMU 12 supplies the clock "cka" to the first circuit block 11A and also supplies the control signal "ca" of the supply voltage to the LDO regulator 40A. Further, the PMU 12 supplies the clock "ckb" to the second circuit block 11B and also supplies the control signal "cb" of the supply voltage to the LDO regulator 40B. The PMU 12 changes the frequency of the clock and the voltage to be supplied in accordance with the load state of each circuit block specified by the DVFS mode from outside, and controls each circuit block so as to reduce power consumption while maintaining the desired processing speed.

Figure 1A:
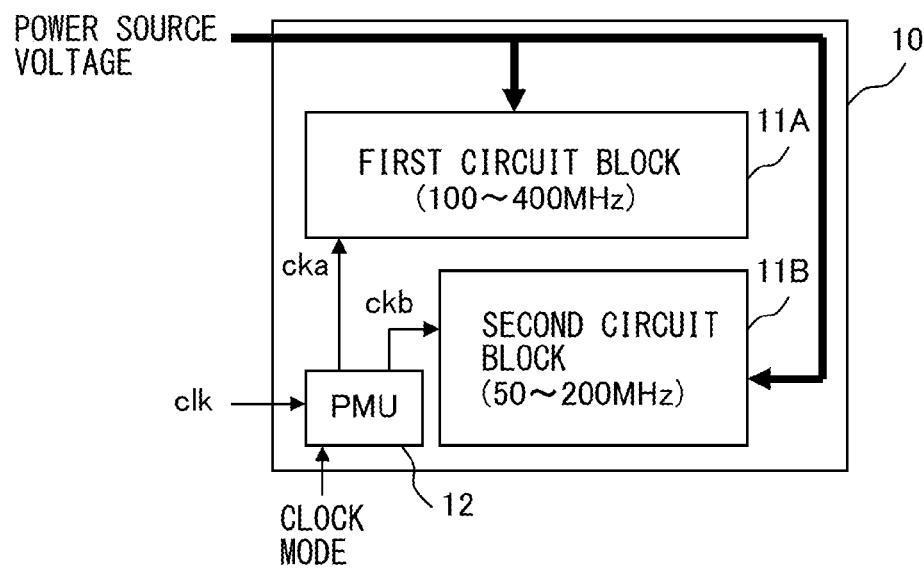
FIG. 1A is a diagram illustrating a schematic configuration of an LSI in which an operation frequency for each circuit part is changed.
Figure 1B:
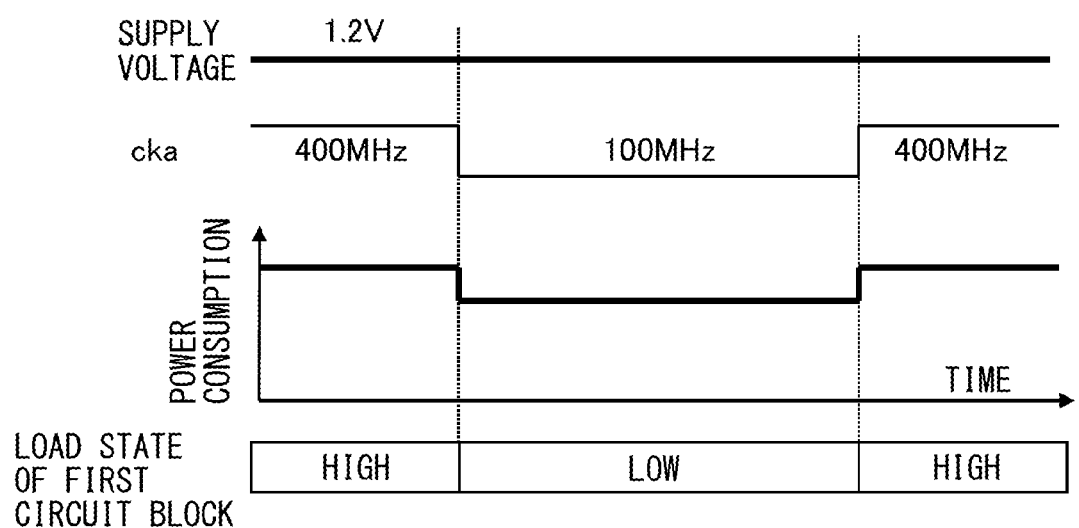
FIG. 1B is a diagram illustrating a time chart indicating the operation of the LSI illustrated in FIG. 1A.
Figure 2A:
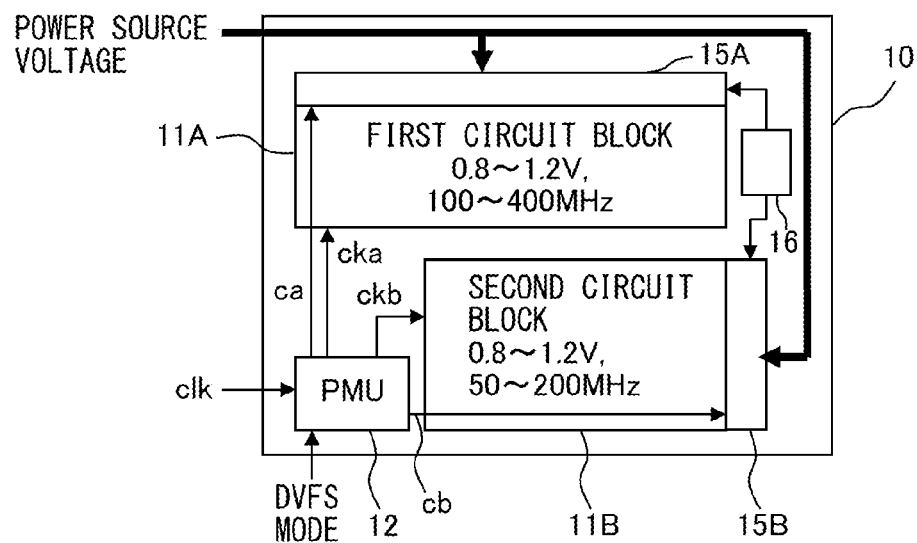
FIG. 2A is a diagram illustrating a schematic configuration of the LSI to which the DVFS technique is applied.
Figure 2B:
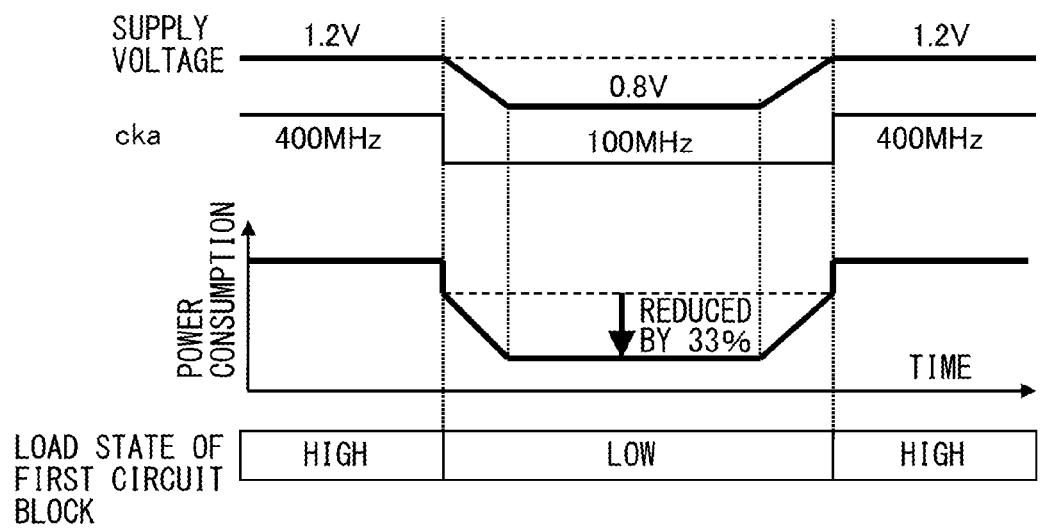
FIG. 2B is a diagram illustrating a time chart indicating an operation of the LSI illustrated in FIG. 2A.
Figures 3A, 3B, 3C:
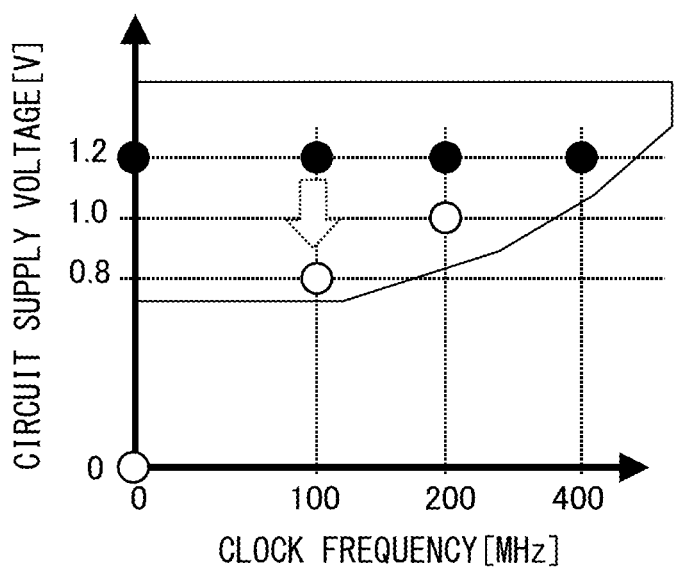
FIG. 3A to FIG. 3C are diagrams illustrating the changes in the clock frequency and in the supply voltage in accordance with the load of the first circuit block 11A of the LSI, in which only the clock frequency is changed as illustrated in FIG. 1A and FIG. 1B and the DVFS technique is applied.

As described above, the LSI 10 of the first embodiment has a configuration similar to that of the LSI illustrated in FIG. 2A, however, differs from it in that the VREF generation circuit 16 is not provided and in that the configurations of the LDO regulator 40A and the LDO regulator 40B are different from those of the LDO regulator 15A and the LDO regulator 15B. The first circuit block 11A except for the LDO regulator 40A, the second circuit block 11B except for the LDO regulator 40B, and the PMU 12 are the same as those in FIG. 2A, and therefore, explanation is omitted. Further, the LDO regulator 40A and the LDO regulator 40B have similar configurations and in the following, explanation is given by referring to them as an LDO regulator 40.

Figure 6:
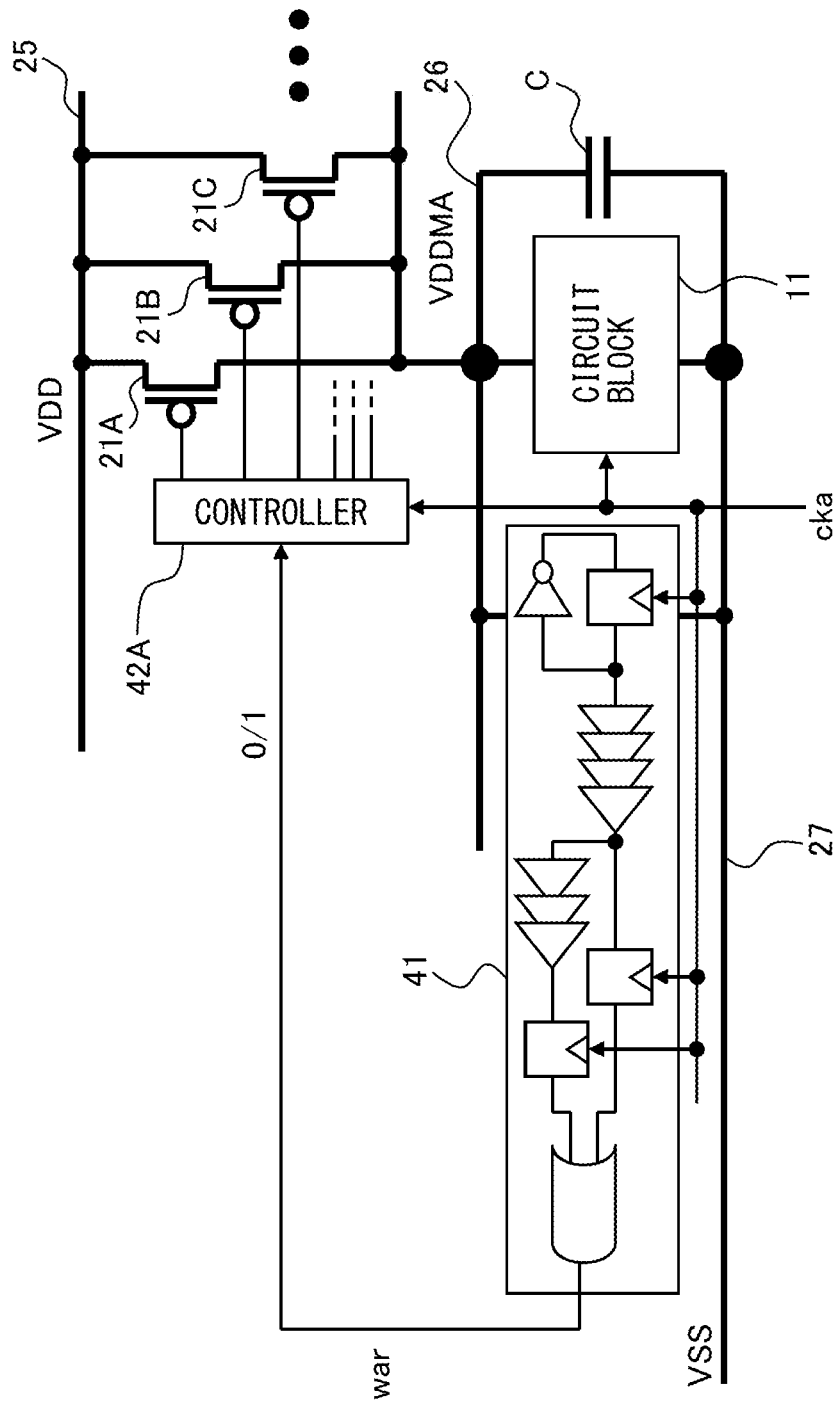
FIG. 6 is a circuit diagram of the LDO regulator in the first embodiment, also illustrating together the circuit block to which the power source voltage is supplied from the LDO regulator.

FIG. 6 is a circuit diagram of the LDO regulator 40 in the first embodiment, also illustrating together the circuit block 11 to which the power source voltage is supplied from the LDO regulator 40. In the circuit diagram of the LDO regulator 40 below, there is also a case where the circuit block 11 is illustrated together. For example, the first circuit block 11A in FIG. 5 corresponds to the circuit block 11 and the LDO regulator 15A corresponds to the LDO regulator 40. It may also be possible to provide the LDO regulator 40 as a part of the circuit block 11.

The LDO regulator 40 in the first embodiment has a plurality of the supply transistors 21A, 21B, 21C, ..., a delay monitor circuit 41, and a controller 42A.

Each of the plurality of the supply transistors 21A, 21B, 21C, ... is a PMOS transistor provided in parallel between the high-potential side power source line 25 of the voltage VDD and the local power source line 26 of the circuit block 11. The turning on and off of the plurality of the supply transistors 21A, 21B, 21C, ... are controlled by the control signal from a controller 44A that is applied to the gate thereof. Although depending on the load state of the circuit block 11, the basic operation is such that as the number of the plurality of the turned-on supply transistors 21A, 21B, 21C, ... increases, the voltage VDDMA of the local power source line 26 of the circuit block 11 rises, and as the number of the turned-on transistors decreases, the VDDMA drops. In other words, the LDO regulator 40 performs digital control so that the VDDMA is set to a desired minimum supply voltage value when putting the circuit block 11 into an operable region.

The delay monitor circuit 41 has a critical path monitor that simulates a delay of the critical path that determines the limit of the operation frequency inside the circuit block 11, and is connected to the same local power source line 26 as that of the circuit block 11 and the voltage VDDMA is applied thereto. A monitor output signal "war", which is an output of the delay monitor circuit 41, is a digital signal that changes to "0" or "1" in accordance with whether the delay of the critical path monitor is in the range in which the operation is normal. Specifically, the monitor output signal "war" is "1" when the voltage VDDMA is in the range in which the operation is normal and is "0" when it is beyond the range in which the operation is normal. In this manner, the output of the delay monitor circuit 41 (monitor output signal "war") is a logical value of "0" or "1", and changes depending on whether or not the amount of delay of the critical path monitor is in the range in which the operation is normal in accordance with the change in the voltage value of the local power source.

The controller 42A controls the number of the plurality of the turned-on supply transistors 21A, 21B, 21C, ... in accordance with the output of the delay monitor circuit 41. Specifically, the controller 42A performs control so as to decrease the number of the turned-on transistors when the monitor output signal "war" is "1" and increase the number of the turned-on transistors when the monitor output signal "war" is "0".

Figure 7:
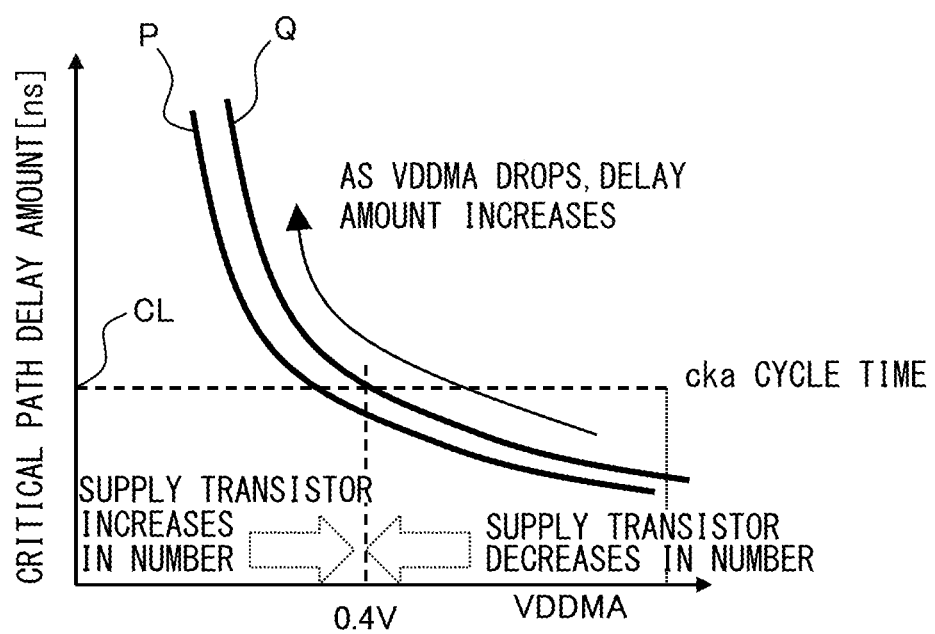
FIG. 7 is a diagram explaining control processing in the LDO regulator.

FIG. 7 is a diagram explaining control processing in the LDO regulator 40. In FIG. 7, the horizontal axis represents the power source voltage VDDMA and the vertical axis represents the amount of delay of the critical path of the circuit block 11. As will be described later, the critical path monitor simulates the critical path of the circuit block 11, however, is not a circuit that generates the same amount of delay. The critical path monitor is set so as to generate an amount of delay somewhat larger than the amount of delay of the critical path of the circuit block 11. In FIG. 7, the amount of delay of the critical path monitor is illustrated after normalization so that the amount of delay of the critical path of the circuit block 11 and the amount of delay of the critical path monitor and the amount of delay of the critical path monitor can be compared directly. This is the same also in the other diagrams. In FIG. 7, reference symbol "P" indicates a change curve of the amount of delay of the critical path in the circuit block 11 when the VDDMA changes. In the case where the cycle time of the "cka" is at a level indicated by reference symbol "CL" in FIG. 7, if the amount of delay of the critical path is not equal to or less than the cycle time of the "cka", the circuit block 11 does not operate normally any longer, and therefore, it is desirable for the cycle time to be equal to or less than the level indicated by reference symbol "CL". Reference symbol "Q" indicates a change curve indicating the amount of delay of the critical path monitor when the VDDMA changes. If the level indicated by reference symbol "CL" is higher than the change curve "Q", there is a margin in the amount of delay, and therefore, "war"="1" is output and control is performed so that the VDDMA is caused to drop by decreasing the number of the supply transistors. On the contrary, if the level indicated by reference symbol "CL" is lower than the change curve "Q", the amount of delay is too large, and therefore, "war"="0" is output and control is performed so that the VDDMA is caused to rise by increasing the number of the supply transistors. The amount of delay of the critical path or the critical path monitor has a relationship with the VDDMA in which the amount of delay monotonically reduces as the VDDMA rises. As illustrated schematically, the critical path monitor is set so that the amount of delay is somewhat larger than the amount of delay of the critical path at all times even when the VDDMA takes any value. Consequently, in the case where the critical path monitor operates normally, it is guaranteed that the critical path in the circuit block 11 operates normally.

The LDO regulator 40 operates the delay monitor circuit 41 with the same clock "cka" as that with which the LDO regulator 40 operates the circuit block 11. When determining that the cycle time of the "cka" at that time will cause the critical path of the circuit block 11 to operate abnormally, the delay monitor circuit 41 determines that the VDDMA is lower than the target value and, for example, outputs "0" as the monitor output signal "war". In response, the controller 42A performs control so as to increase the amount of supply current to the circuit block 11 by increasing the number of the plurality of the turned-on supply transistors 21A, 21B, 21C, ... by one. On the contrary, when determining that the critical path of the circuit block 11 will operate normally, the delay monitor circuit 41 determines that the VDDMA is higher than the target value and, for example, outputs "1" as the monitor output signal "war". In response, the controller 42A performs control so as to decrease the amount of supply current to the circuit block 11 by decreasing the number of the plurality of the turned-on supply transistors 21A, 21B, 21C, ... by one.

By repeating the operation as described above, the VDDMA is held in the vicinity of the target value of the VDDMA determined by the cycle time of the "cka". For example, in the case where 0.4 V is the target value of the VDDMA, the amount of delay of the critical path monitor indicated by the change curve "Q" is set. If the VDDMA is higher than the target value, the amount of delay of the critical path monitor is small, and therefore, the delay monitor circuit 41 outputs "war"="1", and if lower than the target value, the amount of delay of the critical path monitor is large, and therefore, the delay monitor circuit 41 outputs "war"="0".

The critical path monitor of the delay monitor circuit 41 is configured as a replica circuit that simulates the critical path (real path: the change curve P in FIG. 7) of the actual circuit block 11 and the amount of delay changes depending on the VDDMA value similar to the real path (the change curve "Q" in FIG. 7). As described above, if the amount of delay of the replica circuit is set somewhat larger, it is possible to control the actual circuit block 11 so as to operate more safely.

Further, if the operation frequency of the "cka" is changed in accordance with the change in the load state of the circuit block 11, as a result, the critical path monitor determines whether critical path of the circuit block 11 operates normally or abnormally at the cycle time of the "cka" set newly. Consequently, it is possible to perform the LDO control toward the new target value of the VDDMA adapted to the changed cycle time value, and therefore, the DVFS holds automatically as a result.

As described above, all of the processing in the LDO regulator 40 is performed by digital signal processing. That is, if compared with the digital type LDO regulator 30 illustrated in FIG. 4B, the comparator 28 to compare two analog potentials is no longer provided and the control is based on the digital signals of "0" and "1", and therefore, it is possible to form an LDO regulator capable of the operation on a lower voltage. Further, the capacitor element to protect the potentials to be compared from noise or the resistor element to form the variable voltage divider circuit is no longer provided, and therefore, there is an effect that the area occupied by the chip can be reduced. As the delay monitor circuit 41, any circuit may be used as long as the circuit determines whether or not the circuit block 11 operates normally in accordance with the VDDMA and outputs a determination result by a digital value.

Figures 8A, 8B:
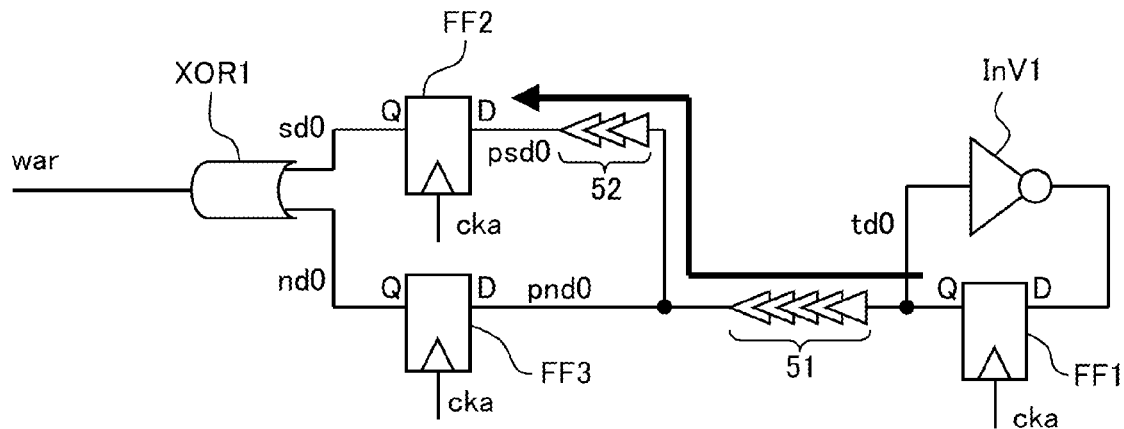
FIG. 8A is a circuit diagram illustrating an example of the circuit of the delay monitor circuit 41.
FIG. 8B is a truth table of the operation of an EXOR gate XOR1.

FIG. 8A is a circuit diagram illustrating an example of the circuit of the delay monitor circuit 41, and FIG. 8B is a truth table of the operation of an EXOR gate XOR1.

As illustrated in FIG. 8A, the delay monitor circuit 41 has an inverter Inv1, a flip-flop FF1, a first delay line 51, a second delay line 52, a monitor FF2, a reference FF3, and the XOR gate XOR1. The portion consisting of Inv1 and FF1 is a divide-by-two frequency divider circuit of the clock "cka" and generates a signal "td0" obtained by dividing the frequency of the "cka" by two. The first delay line 51 delays the signal "td0" and outputs a signal "pnd0". The second delay line 52 further delays the signal "pnd0" and outputs a signal "psd0". The monitor FF2 latches the signal "psd0" in synchronization with the "cka" and outputs a signal "sd0". The reference FF3 latches the signal "pnd0" in synchronization with the "cka" and outputs a signal "nd0". As illustrated in FIG. 8B, XOR1 determines whether an XOR of "sd0" and "nd0", i.e., whether "sd0" and "nd0" agree, and outputs "war"="1" when they agree and outputs "war"="0" when not.

The first delay line 51 and the second delay line 52 form a replica path that simulates a setup critical path of the circuit block 11. The replica path is a circuit whose amount of delay is set somewhat larger than the amount of delay of the setup critical path in the circuit block 11. For example, if the amount of delay of the setup critical path when VDDMA=0.4 V is 5.0 ns, the amount of delay of the replica path formed by the first delay line 51 and the second delay line 52 is set to an amount of delay (for example, 5.5 ns) somewhat larger than 5.0 ns when VDDMA=0.4 V. More specifically, in the case where the amount of delay of the setup critical path is 5.0 ns in the circuit block 11 and the amount of delay of one stage of the gate when VDDMA=0.4 V is set to 0.5 ns, the total number of gate stages of the first delay line 51 and the second delay line 52 is set to a number (for example, 11) somewhat larger than 10. The amount of delay of the first delay line 51 is set so as to be sufficiently smaller than the amount of delay of the setup critical path of the circuit block 11 (for example, five stages) in order that the FF3 latches the reference data correctly at all times. By this, for example, in the case where the "cka" cycle time is set to 5.2 ns, by the critical path monitor outputting "war"="0" before the setup critical path of the circuit block 11 causes an erroneous operation, it is possible to perform control to cause the VDDMA to rise, and therefore, it is possible for the circuit block 11 to operate more safely.

Figure 9A:
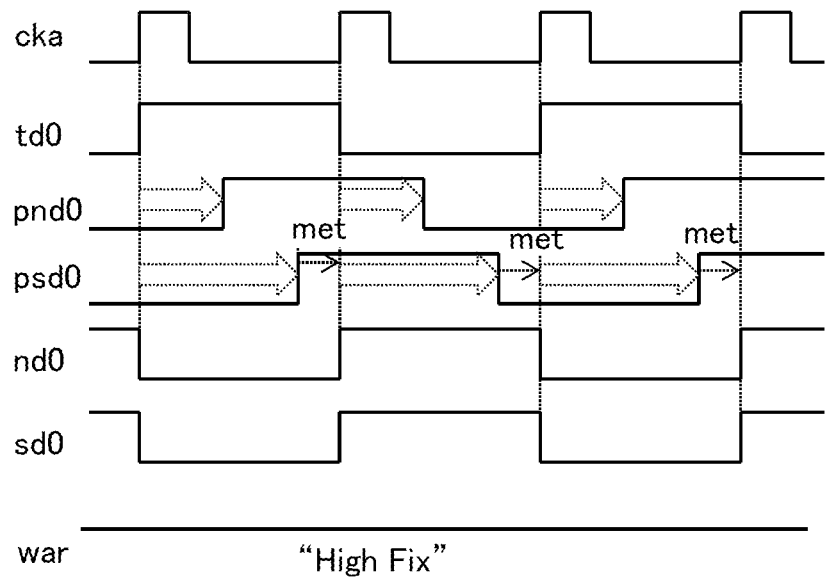
FIG. 9A is a time chart illustrating an operation example of the delay monitor circuit in a case where the VDDMA is high and the delay is small.
Figure 9B:
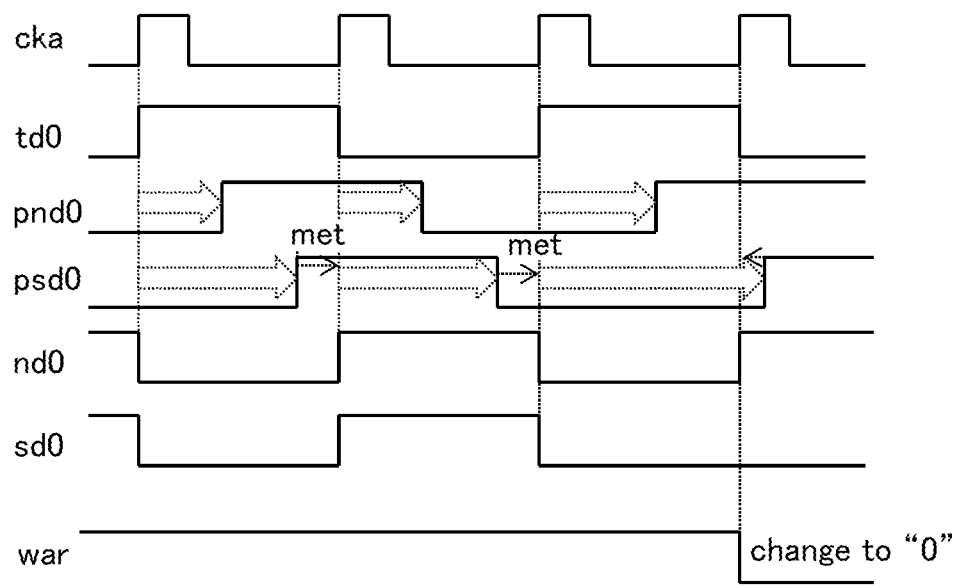
FIG. 9B is a time chart illustrating an operation example of the delay monitor circuit in a case where the VDDMA is low and the delay is large.

FIG. 9A and FIG. 9B are time charts illustrating operation examples of the delay monitor circuit 41, wherein FIG. 9A illustrates a case where the VDDMA is high and the delay is small and FIG. 9B illustrates a case where the VDDMA is low and the delay is large.

As illustrated in FIG. 9A and FIG. 9B, a signal "td0" obtained by dividing the frequency of the "cka" by two performs the toggle operation in which the output changes alternatively to "1" and "0" each time the "cka" rises and continues to generate the signal "td0" as test data. When the VDDMA is sufficiently high, the delay of the critical path monitor is sufficiently short, and therefore, "td0" reaches the monitor FF2 as "psd0" having the same value within one cycle time (one period) of the "cka". On the other hand, the amount of delay of "pnd0" is smaller than that of "psd0", and therefore, "td0" reaches the reference FF3 as "pnd0" having the same value within one cycle time (one period) of the "cka". Consequently, "psd0" taken in by the monitor FF2 has the same value as that of "pnd0" taken in by the reference FF3. As a result of that, "sd0" and "nd0" agree and XOR1 outputs the monitor output signal "war"="1", which is the result of the determination that the supply voltage is higher than the target value. On the contrary, when the supply voltage is insufficient and low, the delay of the critical path monitor is lengthened, and therefore, it is no longer possible for "td0" to reach the monitor FF2 within one cycle time of the "cka", and therefore, "psd0" taken in by the monitor FF2 and pdn0 taken in by the reference FF3 will have different values. As a result of that, "sd0" and "nd0" do not agree, and XOR1 outputs the monitor output signal "war"="0", which is the result of the determination that the supply voltage is lower than the target value.

FIG. 10A and FIG. 10B are diagrams illustrating the controller 42A, wherein FIG. 10A illustrates an example of the configuration of the controller 42A, also illustrating together a plurality (here, seven) of the supply transistors 21A to 21G, and FIG. 10B is a diagram illustrating the operation of the controller 42A.

In the configuration example in FIG. 10A, the controller 42A is implemented by a publicly-known up/down shift register. As illustrated in FIG. 10B, the controller 42A increases the number of the supply transistors to be turned on by one if the signal "war" is "0" at the rise of the "cka", and decreases the number of the transistors to be turned on by one if "war" is "1". Specifically, the supply transistors 21A to 21G are PMOS transistors and turn on if the output of the controller 42A is "0" and turn off if it is "1". The controller 42A shifts the position where "0" or "1" changes to "1" or "0" toward the right side if "war" is "0" and toward the left side if "war" is "1", in the case where the outputs on the left side is "0" and the output on the right side is "1".

FIG. 11 is a time chart illustrating the operation of the controller 42A illustrated in FIG. 10A and FIG. 10B.

If "war"="0", at each rise edge of the "cka", the value of the up/down shift register is incremented (+1). Because of this, the number of the turned-on supply transistors increases and the VDDMA rises, and when the VDDMA exceeds the target value, by the "war" changing to "1" ("war"="1"), the value of the up/down shift register is decremented (−1) and thus the number of the turned-on supply transistors is decreased, and the VDDMA drops. When the VDDMA further falls below the target value, the war changes to "0" again ("war"="0"), and the value of the up/down shift register is incremented (+1) and thus the number of the turned-on supply transistors is increased. By repeating this operation, the VDDMA is kept in the vicinity of the target value.

Figure 12:
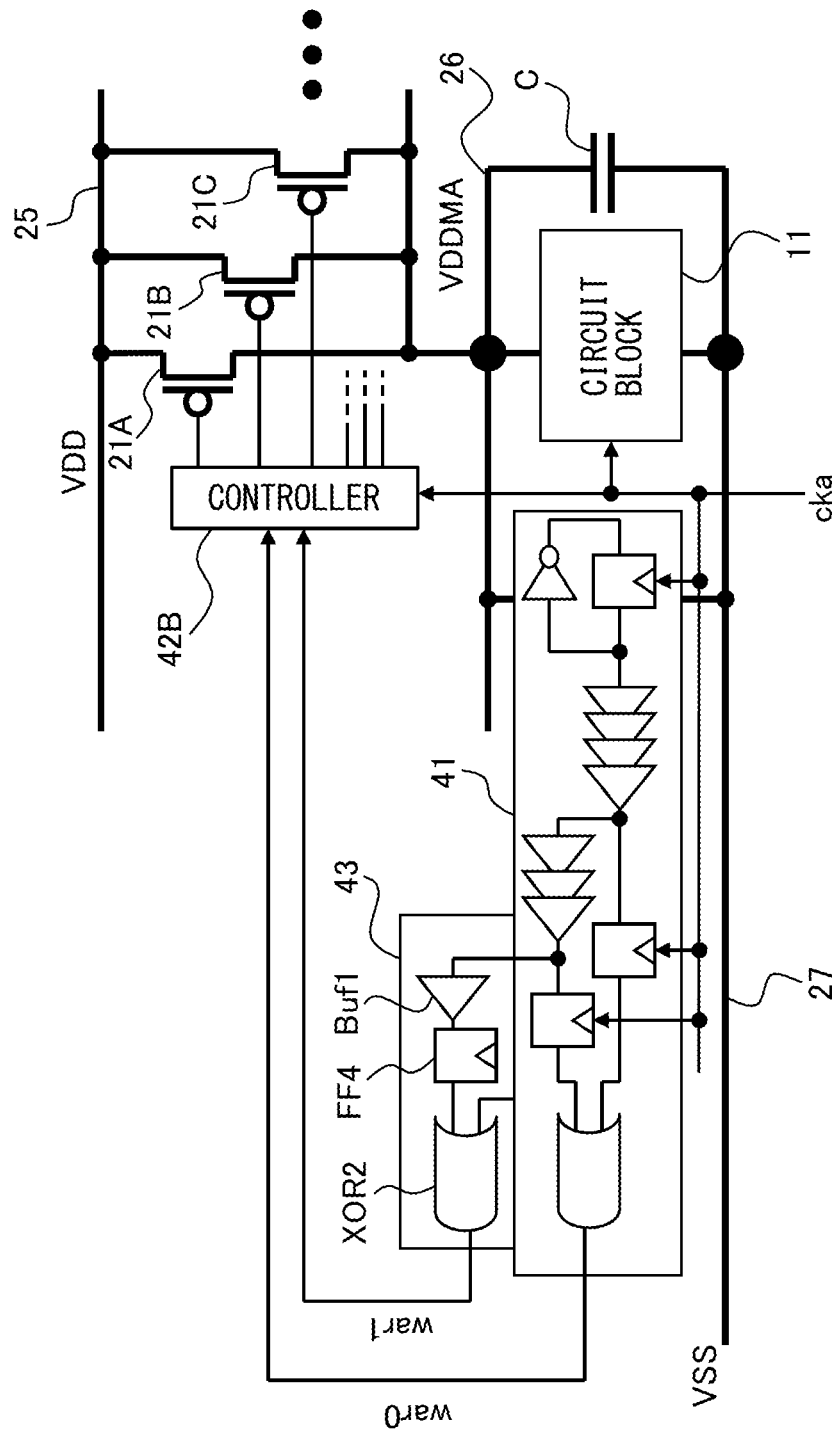
FIG. 12 is a circuit diagram of the LDO regulator in the semiconductor device of the second embodiment.

FIG. 12 is a circuit diagram of the LDO regulator 40 in a semiconductor device of a second embodiment. The semiconductor device of the second embodiment has a configuration similar to the general configuration of the semiconductor of the first embodiment illustrated in FIG. 5, however, differs in the portion of the LDO regulator. The LDO regulator 40 in the first embodiment uses the delay monitor circuit 41 having one critical path monitor. In other words, one critical path monitor determines whether or not the operation is normal. In contrast, the LDO regulator 40 in the second embodiment has two critical path monitors whose amounts of delay are slightly different and controls the number of the turned-on supply transistors in accordance with the determination results of the two critical path monitors.

As illustrated in FIG. 12, the LDO regulator 40 of the second embodiment has a second delay monitor circuit 43 in addition to the first delay monitor circuit 41 the same as the delay monitor circuit of the first embodiment. The first delay monitor circuit 41 outputs a first monitor output signal "war0". The second delay monitor circuit 43 has a buffer Buf1, a flip-flop FF4, and an XOR gate XOR2, and outputs a second monitor output signal "war1". Buf1 further delays the signal "psd0" delayed by the critical path monitor of the first delay monitor circuit 41 and FF4 latches the delayed signal in synchronization with the "cka". XOR 2 performs an XOR operation of the output of FF4 and the output of FF3 of the first delay monitor circuit 41 and outputs the operation result as "war1". Consequently, the amount of delay of the critical path monitor of the second delay monitor circuit 43 is larger than the amount of delay of the critical path monitor of the first delay monitor circuit 41.

Figure 13:
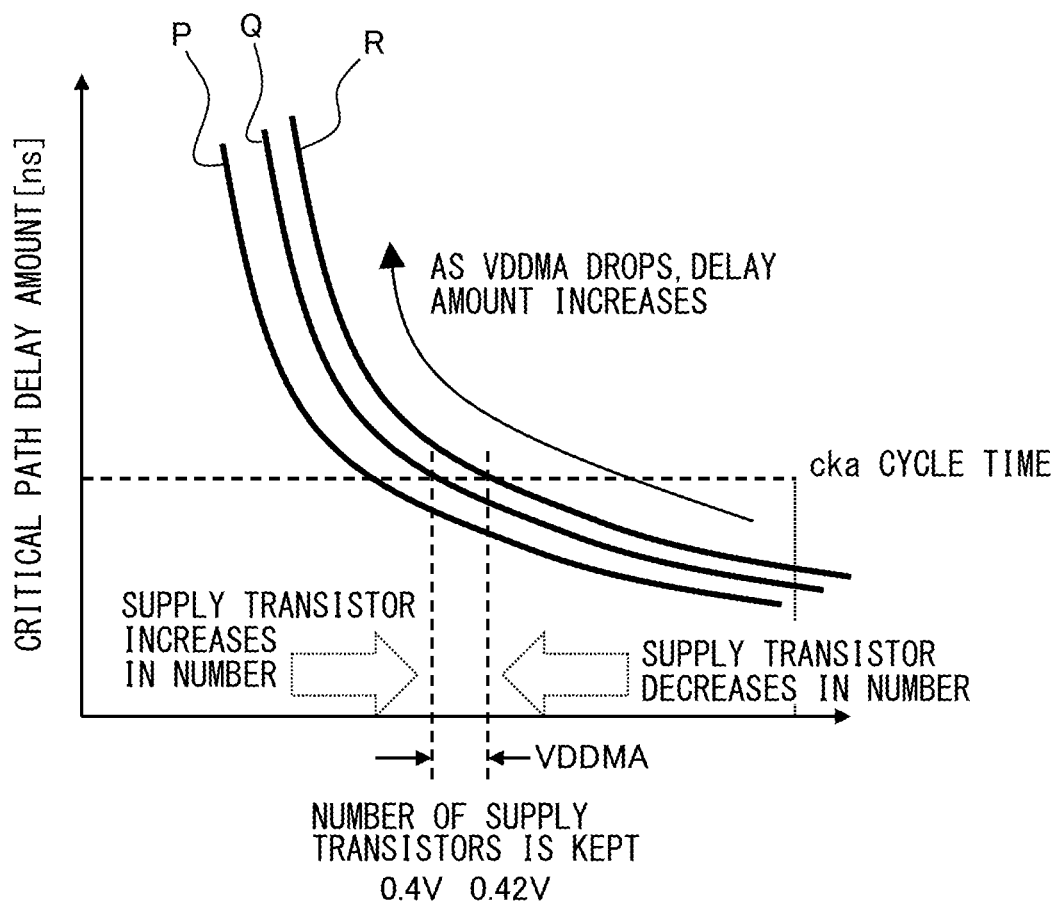
FIG. 13 is a diagram explaining control processing in the LDO regulator of the second embodiment.

FIG. 13 is a diagram explaining control processing in the LDO regulator 40 of the second embodiment, a diagram corresponding to FIG. 7. In FIG. 13, reference symbol "R" indicates a change curve indicating the amount of delay of the critical path monitor of the second delay monitor circuit 43 when the VDDMA changes. The amount of delay of the critical path monitor of the second delay monitor circuit 43 is somewhat larger than the amount of delay of the critical path monitor of the first delay monitor circuit 41 indicated by reference symbol "Q". For example, as illustrated in FIG. 13, if the VDDMA when the amount of delay corresponding to the cycle time of the "cka" is produced is assumed to be 0.4 V on the change curve "Q", the VDDMA that produces the amount of delay corresponding to the cycle time of the "cka" is set to 0.42 V on the change curve "R". In other words, the first delay monitor circuit 41 outputs "war0"="0" if the VDDMA is lower than the low-level target value of 0.4 V and outputs "war0"="1" if the VDDMA is higher than 0.4 V. The second delay monitor circuit 43 outputs "war1"="0" if the VDDMA is lower than the high-level target value of 0.42 V and outputs "war1"="1" if the VDDMA is higher than 0.42 V.

A controller 42B performs control so as to increase the amount of supply current to the circuit block 11 by increasing the number of the plurality of the turned-on supply transistors 21A, 21B, 21C, . . . by one when "war0"="0" and "war1"="0". The controller 42B performs control so as to reduce the amount of supply current to the circuit block 11 by decreasing the number of the plurality of the turned-on supply transistors 21A, 21B, 21C, . . . by one when "war0"="1" and "war1"="1". The controller 42B performs control so as to maintain the number of the plurality of the turned-on supply transistors 21A, 21B, 21C, . . . when "war0"="1" and "war1"="0". After this, the operation is repeated. Consequently, the VDDMA is kept between 0.40 V and 0.42 V.

Figure 14:
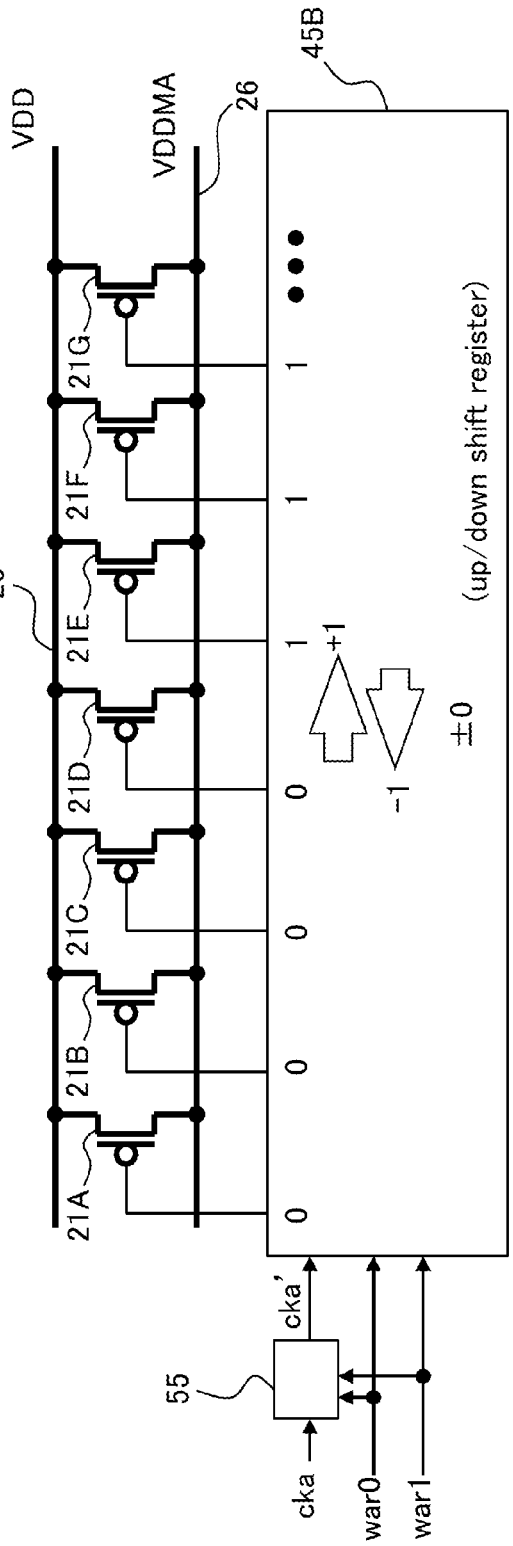
FIG. 14A is a diagram illustrating the controller in the second embodiment.
FIG. 14B is a diagram the operation of the controller.

FIG. 14A and FIG. 14B are diagrams illustrating the controller 42B in the second embodiment, wherein FIG. 14A illustrates an example of the configuration of the controller 42B and FIG. 14B is a diagram illustrating the operation of the controller 42B.

In the configuration example in FIG. 14A, the controller 42B includes an up/down shift register 45 and a clock gate 55. The clock gate 55 allows the "cka" to pass when "war0" and "war1"="0" or "war0" and "war1"="1", and enters the stop state to block the "cka" when "war0"="1" and "war1"="0". Consequently, an output cka' of the clock gate 55 is the "cka" when "war0" and "war1"="0" or "war0" and "war1"="1", and is fixed and does not change when "war0"="1" and "war1"="0".

The up/down shift register 45B increases the number of the supply transistors to be turned on by one if "war0"="0" and "war1"="0" at the rise of the "cka", and decreases the number of the transistors to be turned by one on if "war0"="1" and "war1"="1". Further, the up/down shift register 45B keeps the shift state if "war0"="1" and "war1"="0" because no "cka" is supplied.

Figure 15:
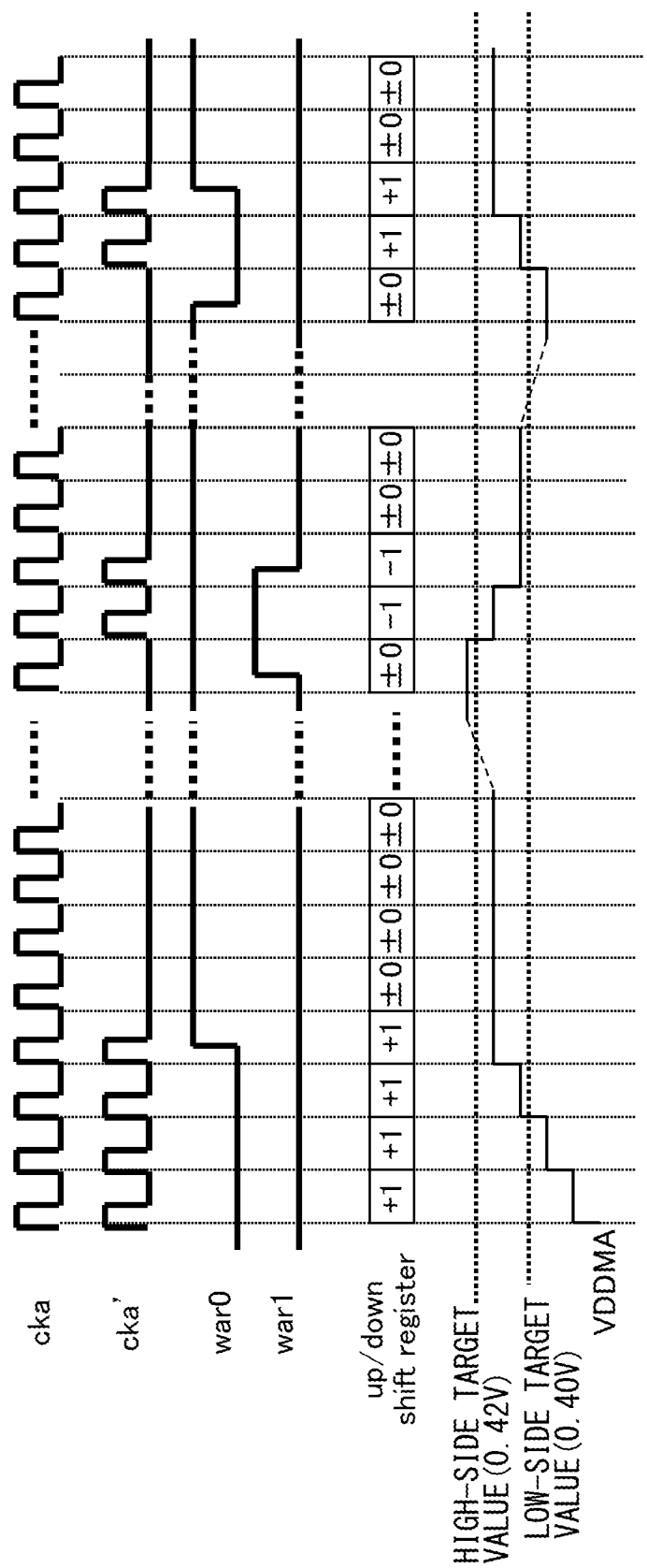
FIG. 15 is a time chart illustrating the operation of the controller illustrated in FIG. 14A and FIG. 14B.

FIG. 15 is a time chart illustrating the operation of the controller 42B illustrated in FIG. 14A and FIG. 14B.

When "war0"="0" and "war1"="1", at each rise edge of the "cka", the value of the up/down shift register 45B is incremented (+1). Because of this, the number of the turned-on supply transistors increases, and the VDDMA rises and exceeds the target value (0.40 V). At this time, the "war0" changes to "1" ("war0"="1"), however, the "war1" is kept at "0" ("war1"="0"), and therefore, the clock gate 55 blocks the "cka", and the value of the up/down shift register 45B is kept and the number of the turned-on supply transistors is also kept.

Further, when the VDDMA exceeds the high-level side target value of 0.42 V, the "war0" changes to "1" ("war0"="1") and the "war1" changes to "1" ("war1"="1"), and therefore, the clock gate 55 allows the "cka" to pass. Because "war0"="1" and "war1"="1", the up/down shift register 45B decrements the value (−1) to decrease the number of the turned-on supply transistors. Accompanying that, the VDDMA drops and when the VDDMA falls below the high-level side target value of 0.42 V, the "war0" changes to "0" again ("war0"="0"), and the value of the up/down shift register 45B is kept and the number of the turned-on supply transistors is also kept. By repeating such an operation, the VDDMA is held between the low-level side target value of 0.40 V and the high-level side target value of 0.42 V.

In the second embodiment, it is possible to remove the voltage ripple (fluctuation) by the undesired increasing/decreasing in the number of the turned-on supply transistors that takes place in the vicinity of the target value of the VDDMA in the first embodiment, and to reduce the power of the control system, such as the up/down shift register 45B, by the function of the clock gate 55.

Next, a semiconductor device of a third embodiment is explained. The semiconductor device of the third embodiment has a configuration similar to the general configuration of the semiconductor device of the first embodiment illustrated in FIG. 5, however, differs in that an attempt to further reduce power consumption has been made by causing the controller 42C to turn off a plurality of the supply transistors in accordance with an enable signal enable.

Figure 16:
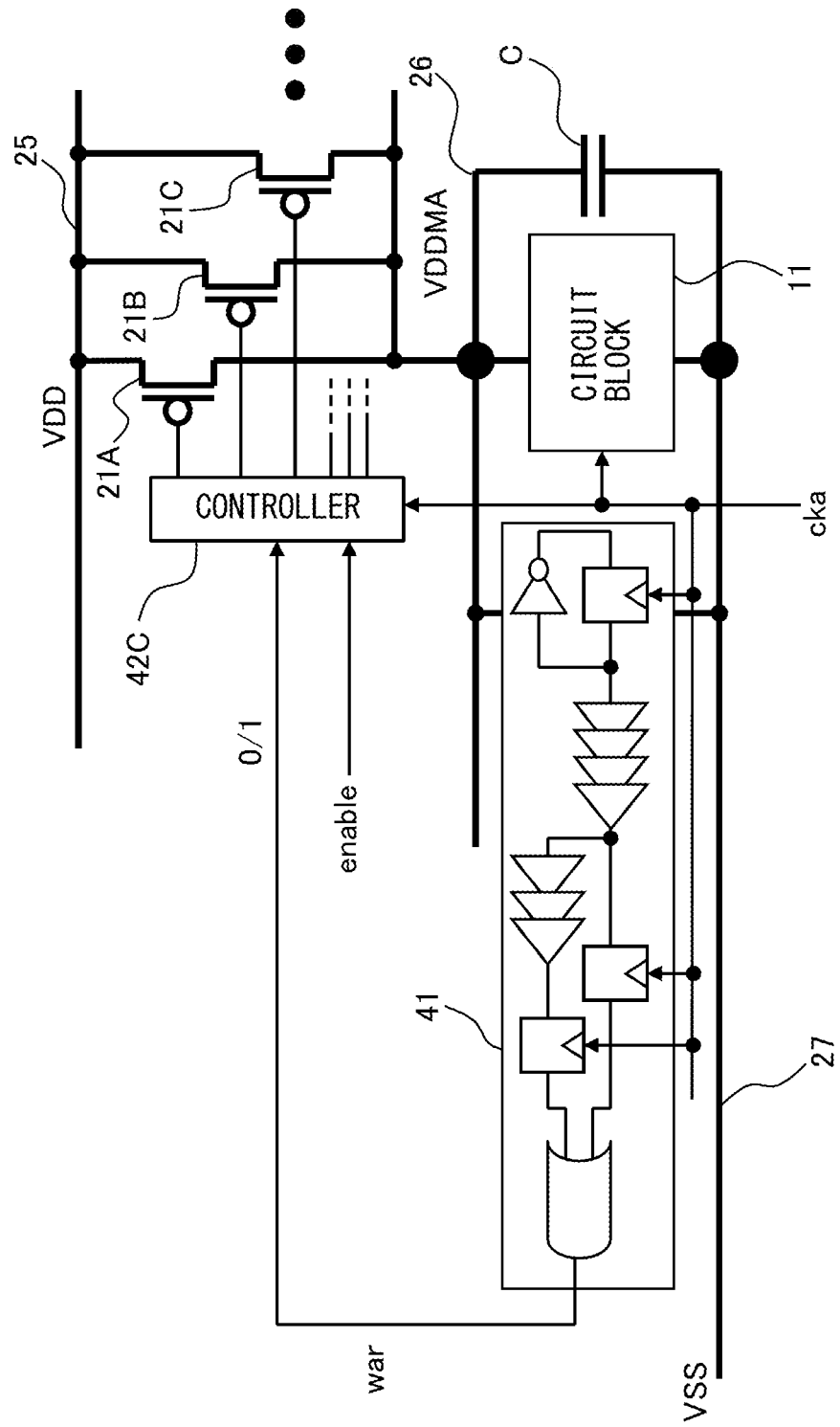
FIG. 16 is a diagram illustrating the configuration of the LDO regulator of the semiconductor device of the third embodiment.

FIG. 16 is a diagram illustrating the configuration of the LDO regulator 40 of the semiconductor device of the third embodiment. The LDO regulator 40 differs from the LDO regulator of the first embodiment in FIG. 6 in that a controller 42C receives the enable signal "enable" and performs the operation in accordance therewith. For example, when the circuit block is not used, the enable signal "enable" is set to "0" (enable signal "enable"="0"). In response, the controller 42C enters the reset state and turns all the outputs to "1", turns off all the plurality of the supply transistors 21A, 21B, 21C, . . . , and stops the supply of power source to the circuit block 11. This is referred to as power gating. Further, in the third embodiment, when cancelling the power gating and bringing the circuit block 11 into the operation state again, i.e., when the enable changes from "0" to "1", the controller 42C turns all the outputs to "0" and turns on all the supply transistors once.

FIG. 17A and FIG. 17B are diagrams illustrating the controller 42C in the third embodiment. FIG. 17A illustrates an example of the configuration of the controller 42C, also illustrating together a plurality (seven) of the supply transistors 21A to 21G. FIG. 17B is a diagram illustrating the operation of the controller 42C.

In the configuration example in FIG. 17A, the controller 42C is implemented by a publicly-known up/down shift register. As illustrated in FIG. 17B, the controller 42C operates in the same manner as that of the controller 42A of the first embodiment while the enable signal "enable" is enabled ("enable"="1"). That is, the controller 42C increases the number of the supply transistors to be turned on by one if the "war" is "0" at the rise of the "cka" when "enable"="1", and decreases the number of the transistors to be turned on by one if the "war" is "1".

Further, the controller 42C in the third embodiment resets all the outputs to 1 when "enable"="0". Because of this, the power gating to turn off all the supply transistors 21A to 21G is performed. Further, the controller 42C sets all the outputs to "1" when the "enable" changes from "0" to "1". Because of this, at the instant the power gating is cancelled, all the supply transistors 21A to 21G turn on and the VDDMA rises up to the power source voltage VDD level once.

Figure 18:
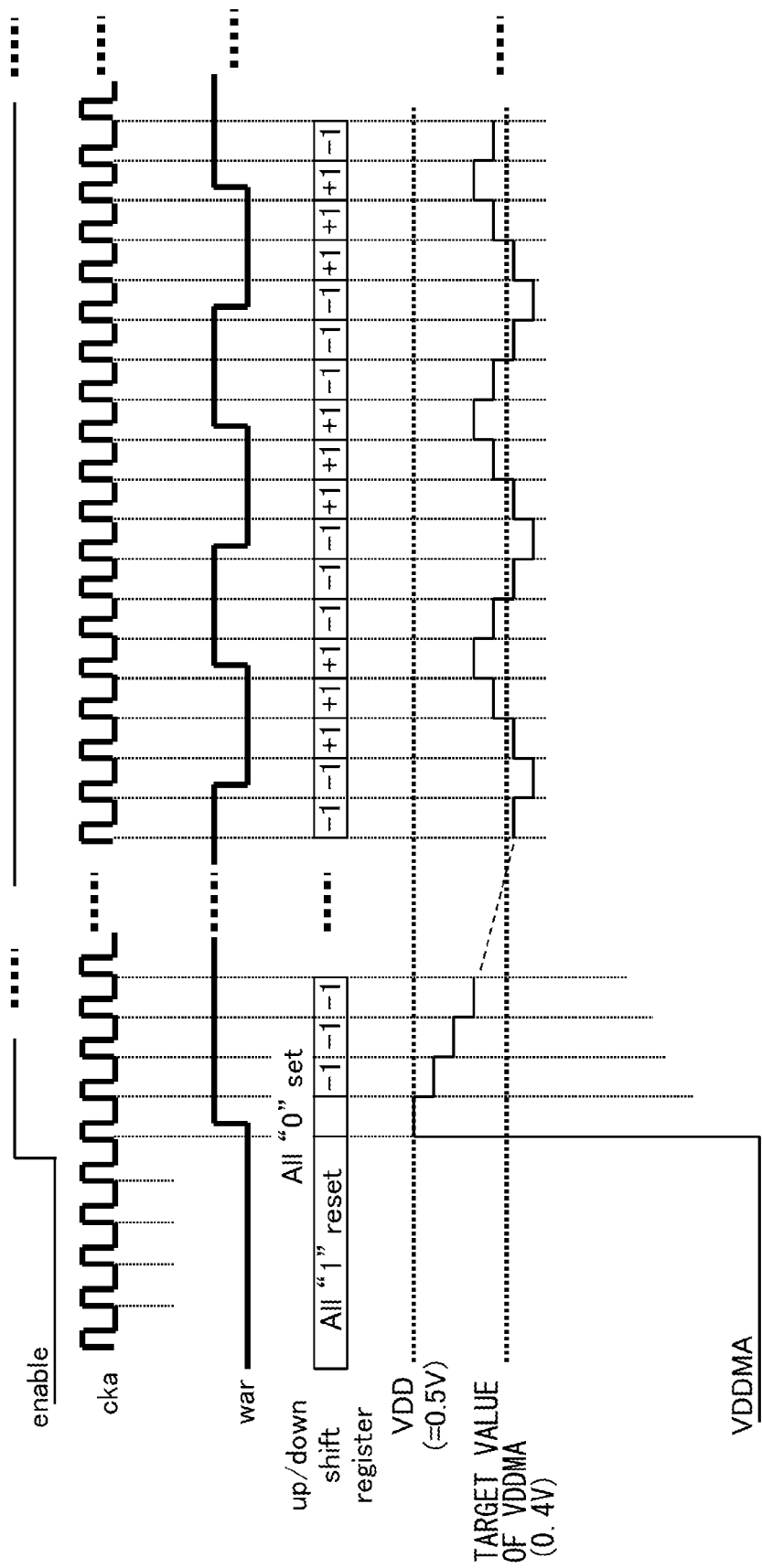
FIG. 18 is a time chart illustrating the operation of the controller illustrated in FIG. 17A and FIG. 17B.

FIG. 18 is a time chart illustrating the operation of the controller 42C illustrated in FIG. 17A and FIG. 17B.

While "enable"="0" and the power gating is in effect, all the outputs of the controller 42C are reset to "1" and all the supply transistors 21A to 21G are turned off. Because of this, the VDDA has fallen to about 0 V. When the enable transits from "0" to "1" by the cancellation of the power gating, all the outputs are set to "0" during a period of time corresponding to one cycle. Because of this, all the supply transistors 21A to 21G turn on and the VDDMA rises once up to the power source voltage VDD (=0.5 V). After that, the operation is the same as that in FIG. 11 and the value of the shift register is incremented (+1) or decremented (−1) so that the VDDMA approaches the target value (0.4 V).

By comparing with the first embodiment, the advantage of the third embodiment lies in that the restoration of the power source can be performed normally and can be increased in speed at the instant that the power gating state where the supply of power source to the circuit block 11 is stopped switches to the state where the power source needs to be supplied. It may be possible to design so that all the outputs can be reset to "1" in accordance with the enable in the first embodiment. However, if control is started from the state where all the outputs are reset to "1" when the "enable" changes from "0" to "1", because the VDDMA is in the vicinity of 0 V, it takes time for the VDDMA to reach the vicinity of 0.4 V. Further, during this period of time, such a problem that the critical path monitor does not operate normally may occur. In the third embodiment, such a problem does not occur and it is possible to restore the power source normally and to increase the speed of the restoration.

Next, a semiconductor device of a fourth embodiment is explained. The semiconductor device of the fourth embodiment has a configuration similar to the general configuration of the semiconductor device of the first embodiment, however, differs from that of the first embodiment in that a clock gate is provided so as to stop the supply of the "cka" when the supply of the clock "cka" to the circuit block 11 is not used. Because of this, it is possible to make an attempt to further reduce power consumption of the semiconductor device (LSI).

Figure 19:
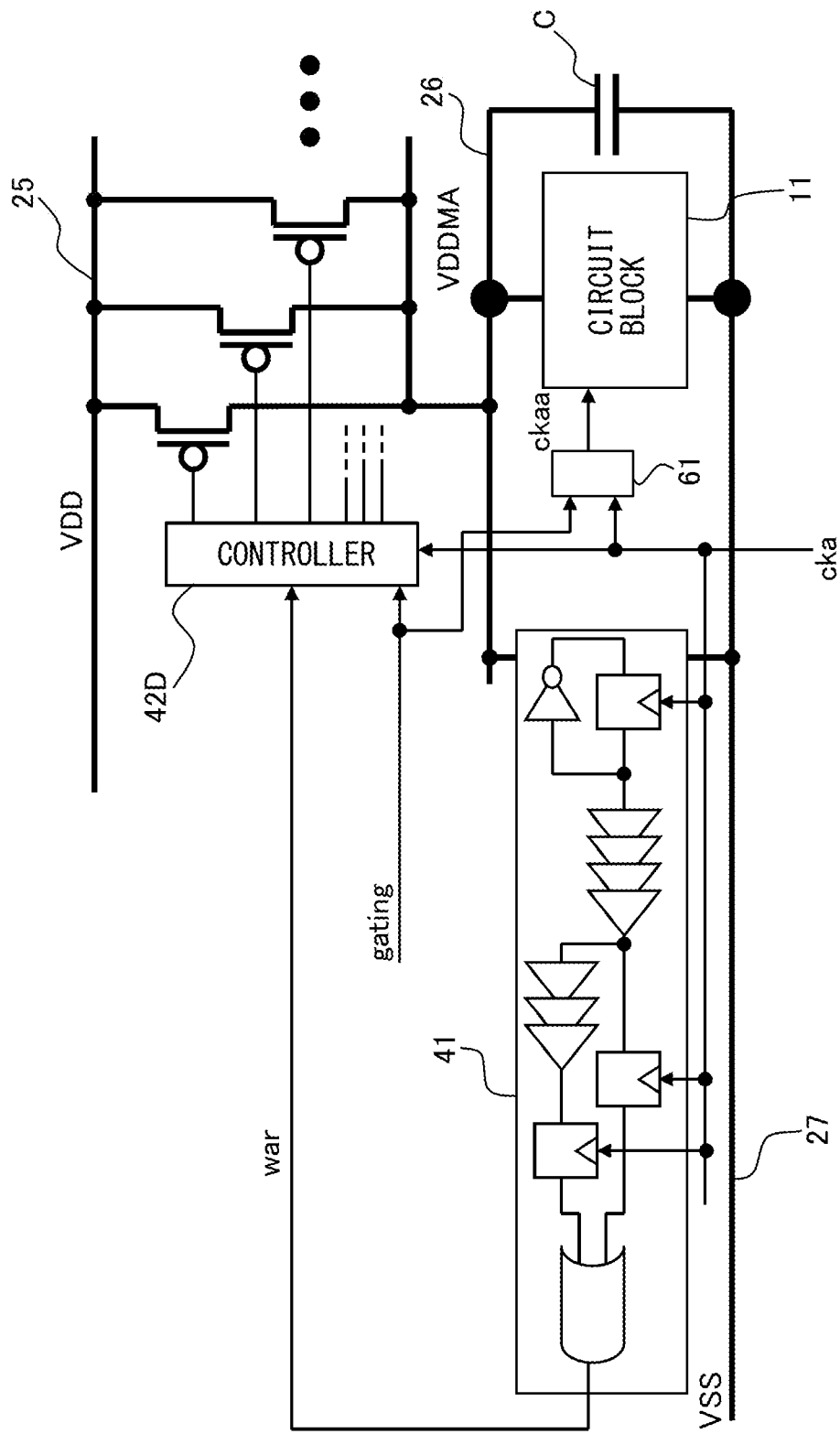
FIG. 19 is a circuit diagram of the LDO regulator in the semiconductor device of the fourth embodiment.

FIG. 19 is a circuit diagram of the LDO regulator 40 in the semiconductor device of the fourth embodiment. The portion indicated by reference number 61 is the clock gate that controls the supply of the clock "cka" to the circuit block 11 and the clock gate 61 supplies a clock "ckaa" to the circuit block 11 when a gating signal "gating"="1" and stops the supply of "ckaa" when "gating"="0". In the LDO regulator 40 of the third embodiment, a controller 42D controls the number of the plurality of turned-on supply transistors in accordance with the gating signal "gating".

Figure 20:
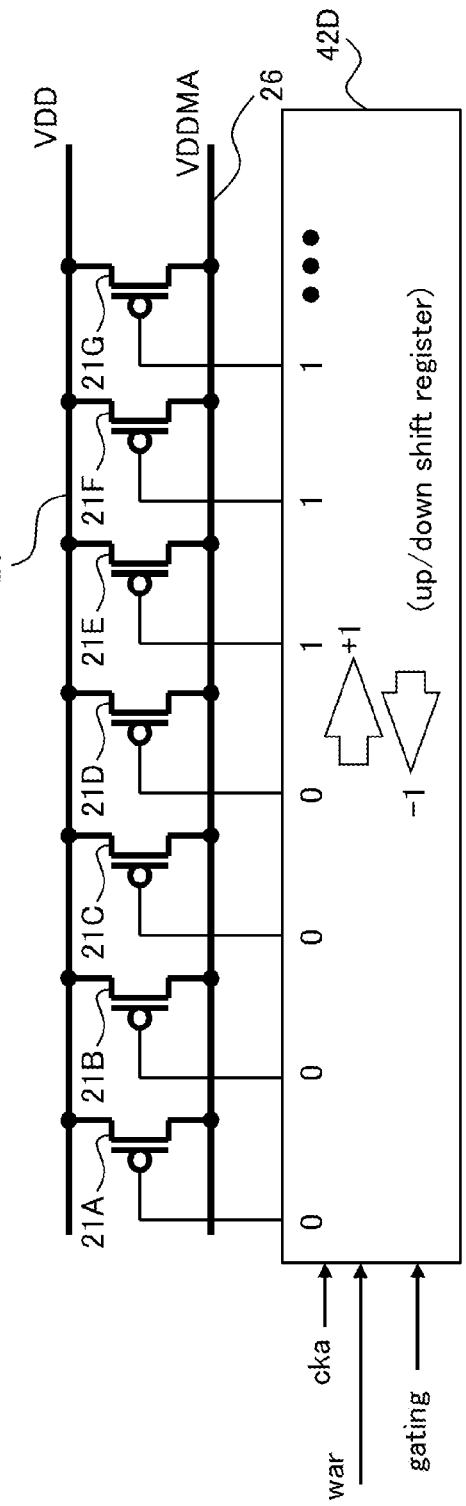
FIG. 20A is a diagram illustrating an example of the configuration of the controller in the fourth embodiment.
FIG. 20B is a diagram illustrating the operation of the controller.

FIG. 20A and FIG. 20B are diagrams illustrating the controller 42D, wherein FIG. 20A illustrates an example of the configuration of the controller 42D and FIG. 20B is a diagram illustrating the operation of the controller 42D.

In the configuration example in FIG. 20A, the controller 42D is implemented by an up/down shift register.

As illustrated in FIG. 20B, the controller 42D performs the same operation as that of the controller 42A of the first embodiment at the time other than the transition from "0" to "1" of the gating signal "gating". The controller 42D resets all the outputs to "0" at the time of transition from "0" to "1" of the gating signal "gating". Because of this, all the supply transistors 21A to 21G are turned on only at the instant that the state where the supply of the clock "ckaa" to the circuit block 11 is stopped switches to the state where the clock "ckaa" is supplied, thereby the VDDMA is caused to rise once up to the power source voltage VDD level. In other words, in the fourth embodiment, the LDO regulator 40 has the full-open function to turn on all the supply transistors 21A to 21G in an instant at the time of transition from "0" to "1" of the gating signal "gating".

Figure 21:
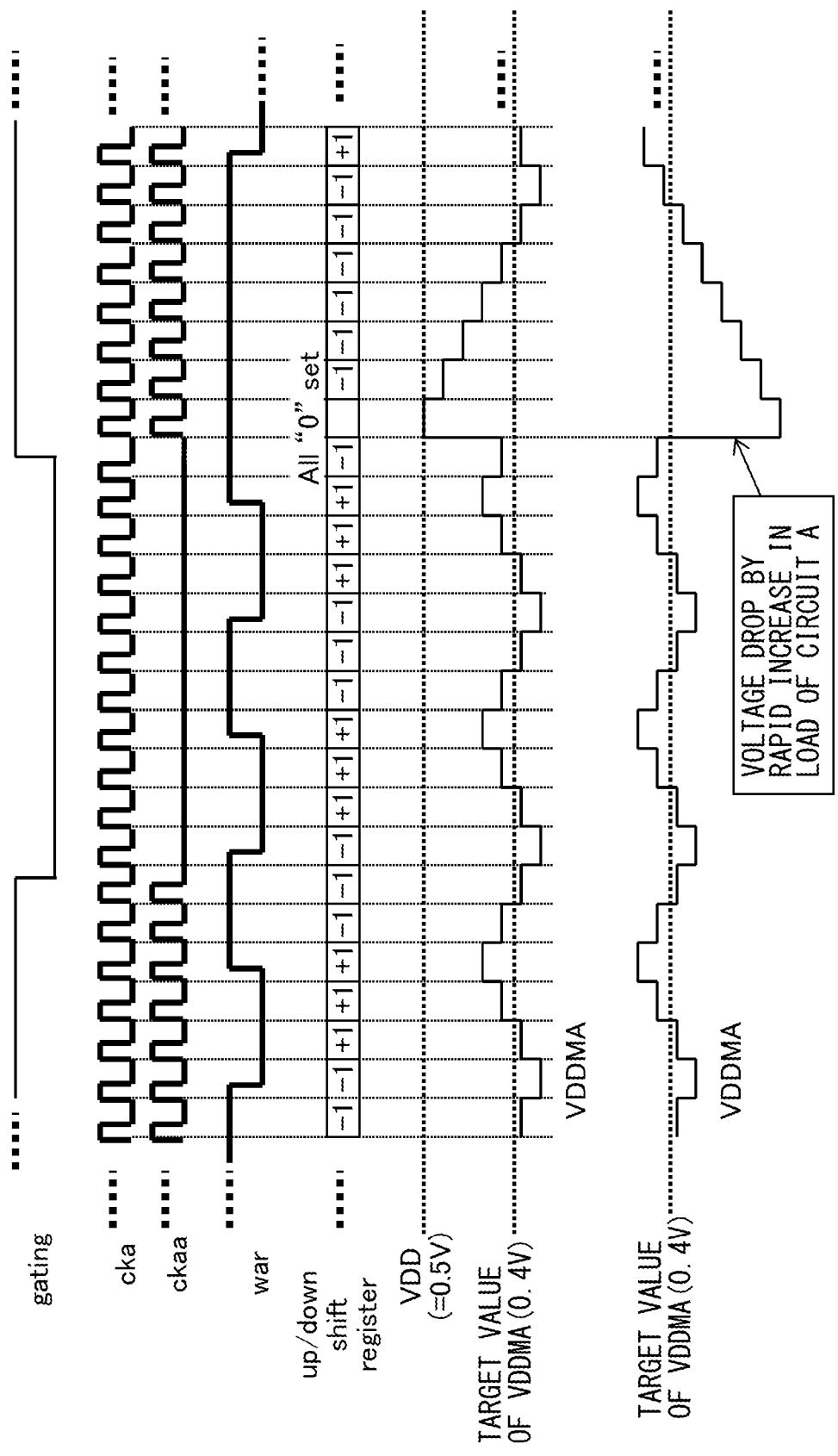
FIG. 21 is a time chart illustrating the operation of the controller illustrated in FIG. 20A and FIG. 20B.

FIG. 21 is a time chart indicating the operation of the controller 42D of the fourth embodiment.

The operation differs from that of the first embodiment in that the "ckaa" is fixed to "0" and the supply of clock to the circuit block 11 is stopped while the "gating" is "0". Further, the operation differs from that of the first embodiment in that when the "gating" changes from "0" to "1", all the outputs of the controller 42D are set to "0" only during a period of time corresponding to one cycle. Because all the outputs are set to "0", all the supply transistors turn on and the VDDMA rises once up to the power source voltage VDD (=0.5 V). After that, the value of the up/down shift register is incremented (+1) or decremented (−1) so that the VDDMA approaches the target value (=0.4 V). FIG. 21 illustrates a case, as a reference example, where the output of the controller 42D is kept in the immediately previous state even if the "gating" changes from "0" to "1".

In the fourth embodiment, compared to the first embodiment, it is possible to suppress such a problem that the VDDMA drops rapidly by the rapid increase in power consumption of the circuit block 11 at the instant that the state where the supply of the clock "ckaa" to the circuit block 11 is stopped switches to the supply state.

Next, a semiconductor device of a fifth embodiment is explained. The semiconductor device of the fifth embodiment has a configuration similar to the general configuration of the semiconductor device of the fourth embodiment illustrated in FIG. 19, however, differs in that forced clock gating control is performed using an abort monitor.

Figure 22:
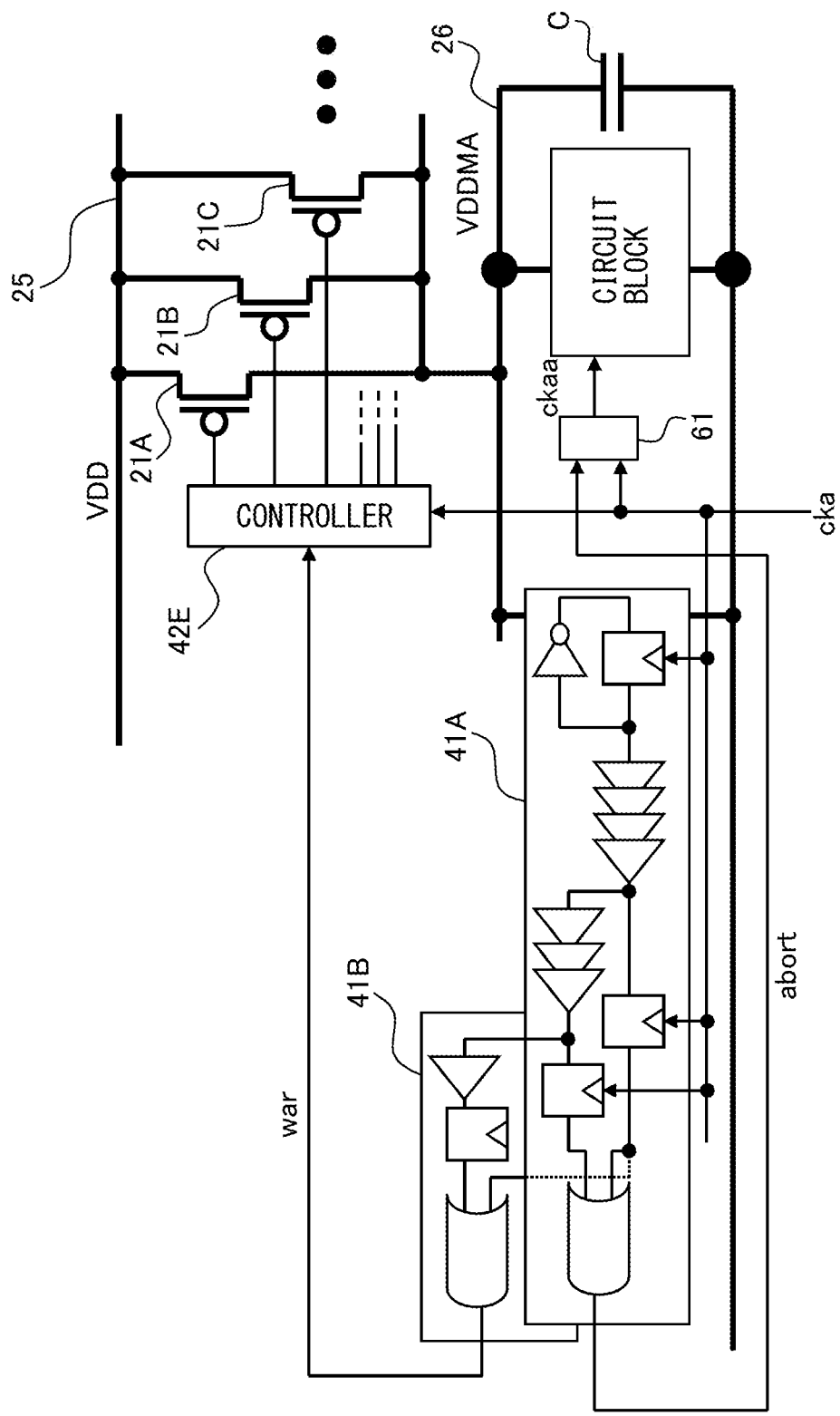
FIG. 22 is a circuit diagram of the LDO regulator in the semiconductor device of the fifth embodiment.

FIG. 22 is a circuit diagram of the LDO regulator 40 in the semiconductor device of the fifth embodiment. The LDO regulator 40 in the semiconductor device of the fifth embodiment differs from that of the fourth embodiment in that the delay monitor circuit 41 has an abort monitor 41A and a critical path monitor 41B. The abort monitor 41A has a configuration similar to that of the critical path monitor of the first embodiment, however, the amount of delay is somewhat smaller than that of the critical path monitor. The critical path monitor 41B determines whether the amount of delay of the signal, which is the signal delayed by the critical path monitor of the abort monitor 41A further delayed, is in the range in which the operation is normal. In other words, part of the abort monitor 41A and the critical path monitor 41B implement the function equivalent to that of the delay monitor circuit 41 of the first embodiment.

Figure 23:
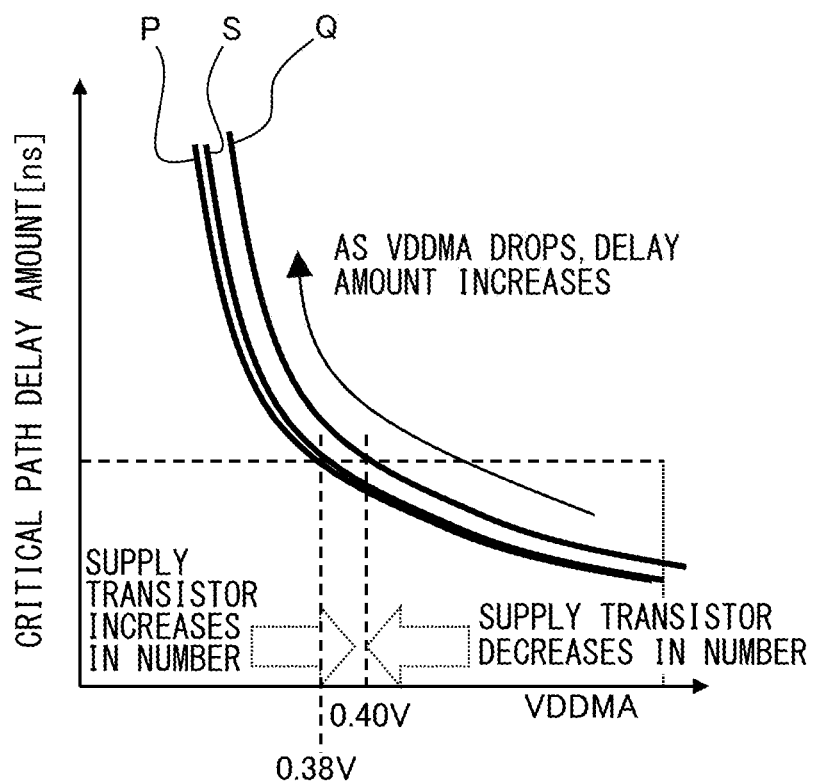
FIG. 23 is a diagram explaining control processing in the LDO regulator of the fifth embodiment

FIG. 23 is a diagram explaining control processing in the LDO regulator 40 of the fifth embodiment, a diagram corresponding to FIG. 7. In FIG. 23, reference symbol "S" indicates a change curve indicating the amount of delay of the abort monitor 41A when the VDDMA changes. In the case where the change curve "S" is located on the side higher than the level indicated by reference symbol "CL", which is the cycle time of the "cka", the abort monitor 41A determines that there is a risk that the internal critical path of the circuit block 11 may function erroneously, and protects the circuit block 11 by performing forced clock gating control to stop the supply of clock. The amount of delay of the critical path monitor of the abort monitor 41A is somewhat smaller than the amount of delay of the critical path monitor of the first delay monitor circuit 41 indicated by reference symbol Q. For example, as illustrated in FIG. 23, if the VDDMA when the amount of delay corresponding to the cycle time of "cka" in the change curve "Q" is produced is 0.4 V, the VDDMA by which the amount of delay corresponding to the cycle time of the "cka" in the change curve "S" is produced is set to 0.38 V. In other words, the abort monitor 41A outputs "abort"="0" if the VDDMA is lower than the abort voltage value of 0.38 V and outputs "abort"="1" if the VDDMA is higher than 0.38 V.

A controller 42E controls the number of the turned-on supply transistors in accordance with the monitor signal "war" of the critical path monitor 41B as in the first embodiment if "abort"="1". In the fifth embodiment, the abort monitor 41A detects whether the VDDMA has fallen to or less than the abort voltage value at which there is a risk that the circuit block 11 may function erroneously. Then, if it is detected that the VDDMA has fallen to or less than the abort voltage value, the clock gating circuit 61 protects the circuit block 11 by performing forced clock gating control.

Figure 24:
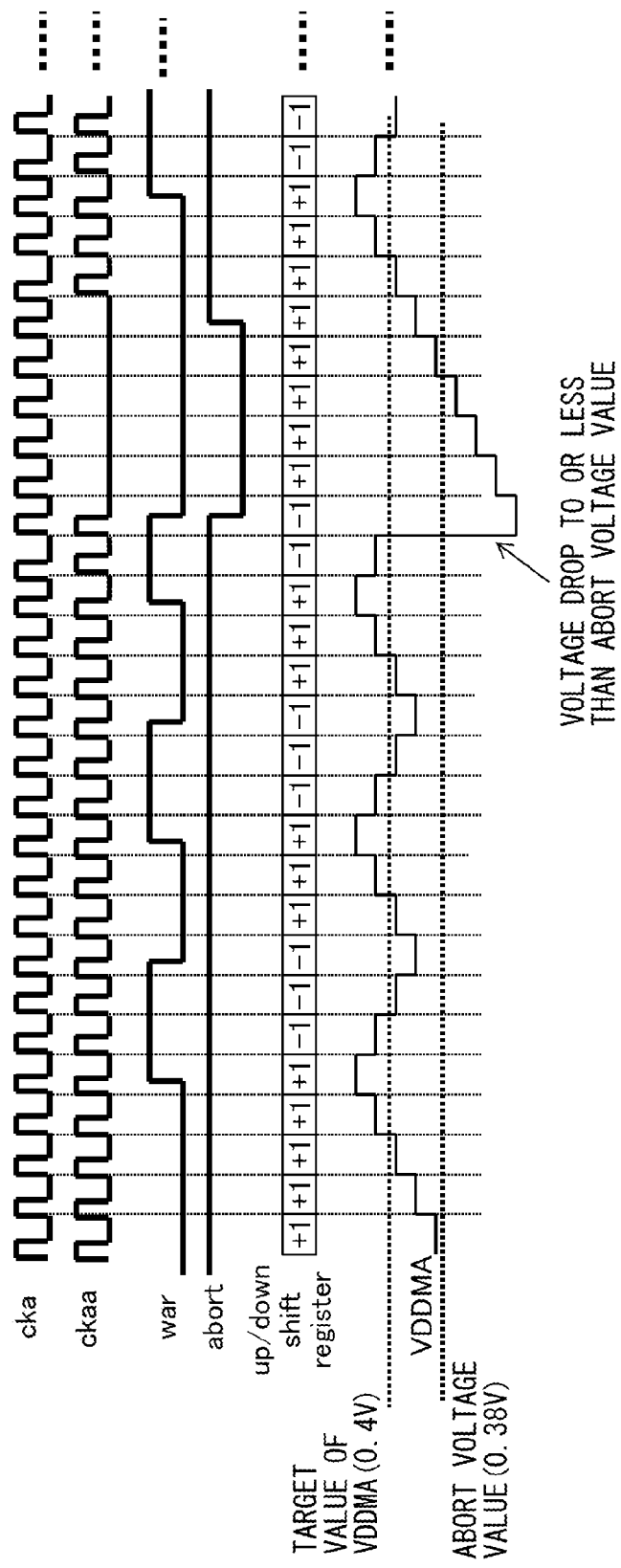
FIG. 24 is a time chart illustrating the operation of the controller of the fifth embodiment

FIG. 24 is a time chart illustrating the operation of the controller 42E of the fifth embodiment.

The controller 42E controls the number of the turned-on supply transistors in accordance with the monitor signal "war" of the critical path monitor 41B as in the first embodiment while "abort"="1".

If the VDDMA has fallen to or less than the abort voltage value (here, 0.38 V) at which an erroneous operation of the circuit block 11 is caused, the abort monitor 41A outputs "abort"="0". In response to this, the clock gating circuit 61 performs clock gating control on the clock that causes the circuit block 11 to operate, and stops the supply of the clock "cka" to the circuit block 11. If the VDDMA rises and exceeds the above-mentioned abort voltage value, the abort monitor 41A determines that the safe voltage value of the VDDMA is restored and outputs "abort"="1". In response to this, the clock gating circuit 61 cancels the clock gating control and resumes the supply of the clock "ckaa" to the circuit block 11.

In the fifth embodiment, it is possible to control the circuit block 11 to operate and stop so as to prevent the circuit block 11 from operating erroneously, and therefore, the reliability of the system operation of the fifth embodiment is higher compared to that of the fourth embodiment.

As above, as to the first to fifth embodiments, the case where the clock "cka" to be supplied to the circuit block 11 does not change during the operation is explained, however, as described previously, in the DVFS control, the frequency of the clock "cka" to be supplied to the circuit block 11 is also changed. Hereinafter, a case is explained where the frequency of the clock "cka" to be supplied to the circuit block 11 during the operation is changed in the LDO regulator 40 of the semiconductor device of the first embodiment. In the other embodiments also, if the clock "cka" is changed during the operation, the same operation is performed.

Figure 25:
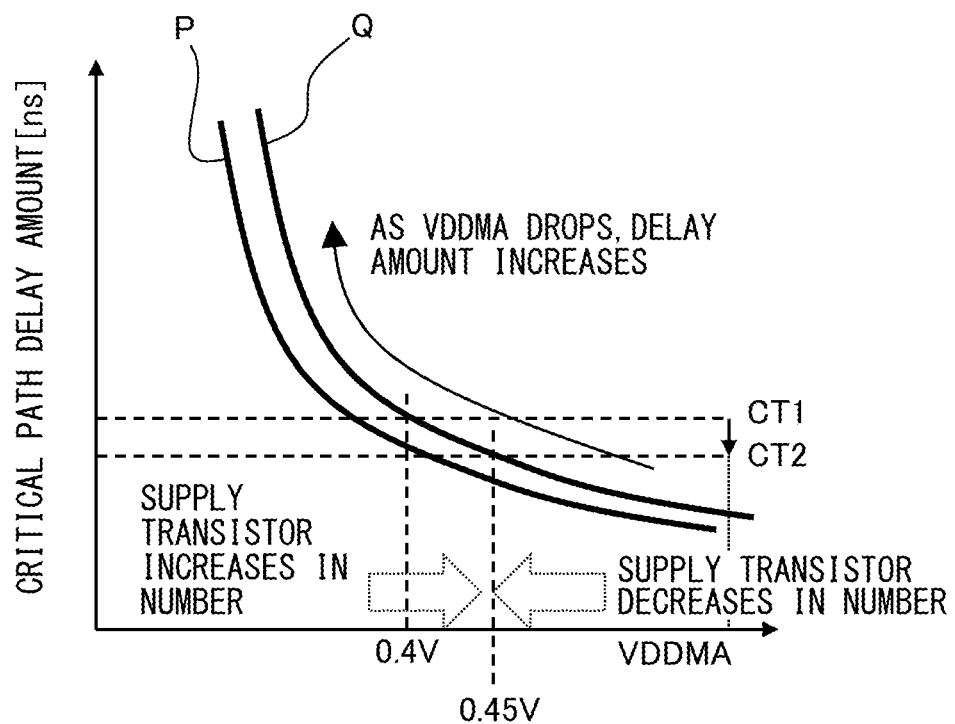
FIG. 25 is a diagram explaining control processing in the LDO regulator in the case where the frequency of the clock "cka" is increased in the first embodiment.

FIG. 25 is a diagram explaining control processing in the LDO regulator 40 in the case where the frequency of the clock "cka" is increased, i.e., the cycle time of the clock "cka" is reduced from "CT1" to "CT2" in the LDO regulator 40 of the semiconductor device in the first embodiment.

Figure 26:
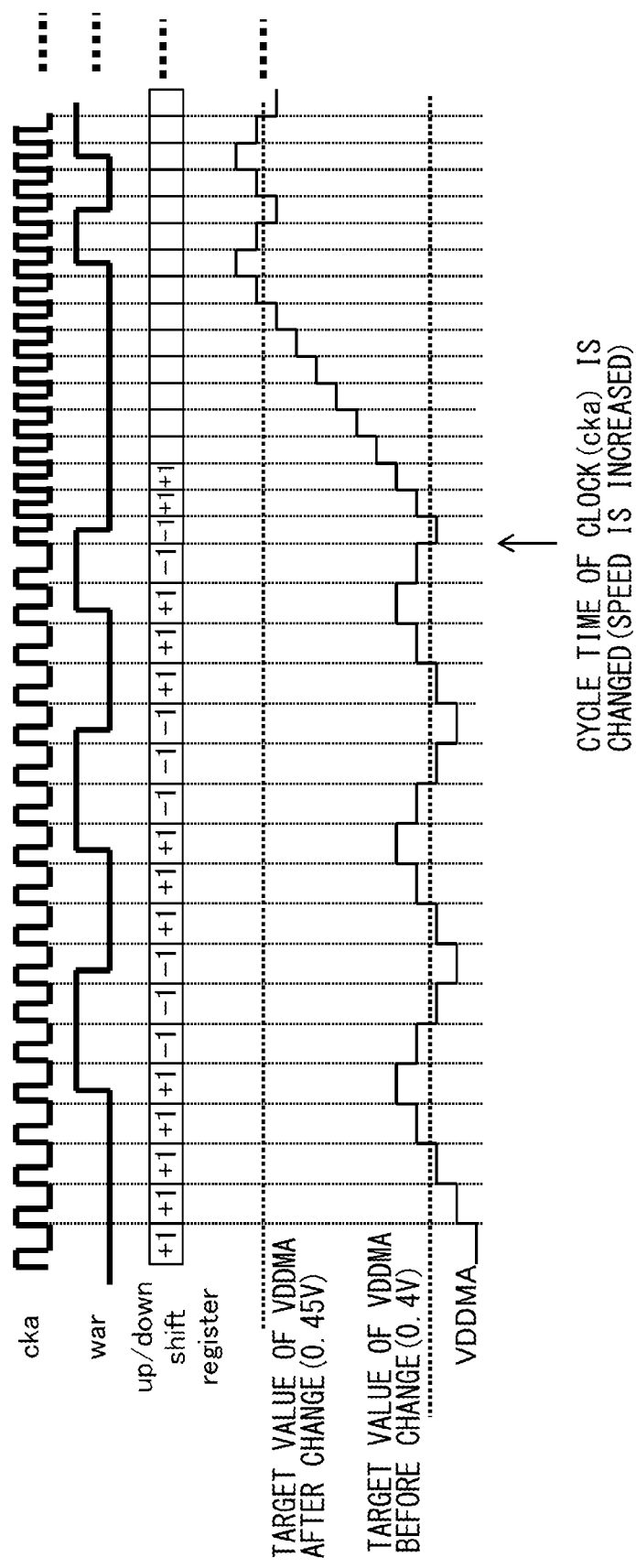
FIG. 26 is a time chart illustrating the operation of the controller in the case where the cycle time of the clock "cka" is reduced in the first embodiment.

FIG. 26 is a time chart illustrating the operation of the controller 42A in the case where the cycle time of the clock "cka" is reduced from "CT1" to "CT2" in the LDO regulator 40 of the semiconductor device in the first embodiment.

When the cycle time="CT1", the control of the LDO regulator 40 is performed on the assumption that the VDDM of 0.4 V (VDDMA=0.4 V) that produces the amount of delay corresponding to "CT1" on the change curve "Q" is the target value of the VDDMA. If the cycle time is changed from "CT1" to "CT2", the VDDMA of 0.45 V ("VDDMA"=0.45 V) that produces the amount of delay corresponding to "CT1" on the change curve "Q" is the target value after the change and then the control of the LDO regulator 40 is performed. Because the target value of the VDDM increases, the monitor signal war output from the delay monitor circuit 41 is "0" ("war"="0") and the controller 42A increases the number of the turned-on supply transistors one by one. Because of this, the VDDMA rises toward the target value of 0.45 V. Then, after the VDDMA reaches the target value of 0.45 V, the VDDMA is held in the vicinity of 0.45 V.

Figure 27:
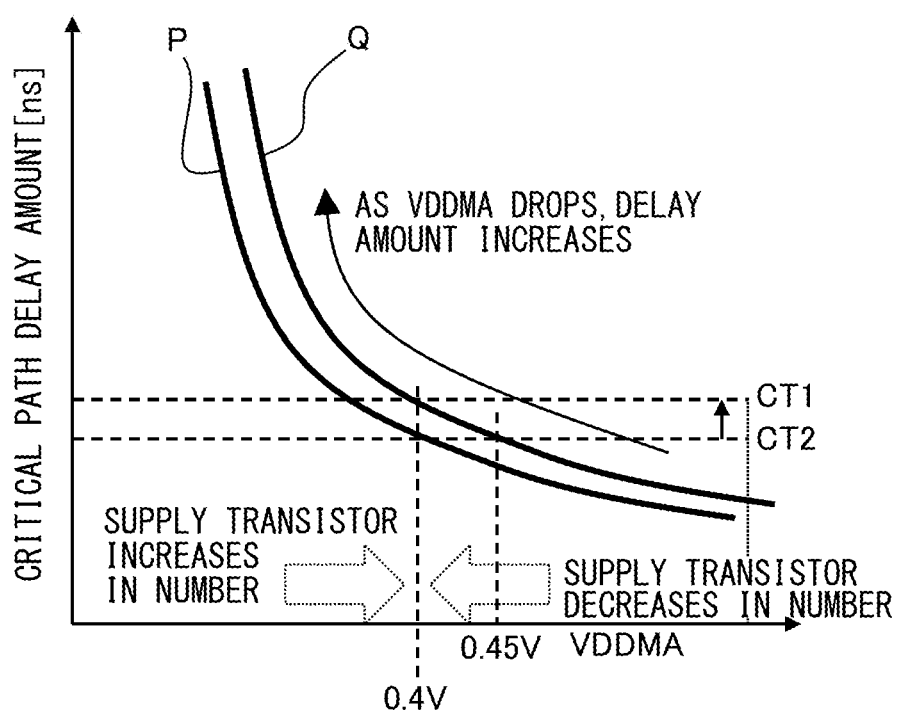
FIG. 27 is a diagram explaining control processing in the LDO regulator in the case where the frequency of the clock "cka" is reduced in the first embodiment.

FIG. 27 is a diagram for explaining control processing in the LDO regulator 40 in the case where the frequency of the clock "cka" is reduced, i.e., the cycle time of the clock "cka" is increased from "CT2" to "CT1" in the LDO regulator 40 of the semiconductor device of the first embodiment.

Figure 28:
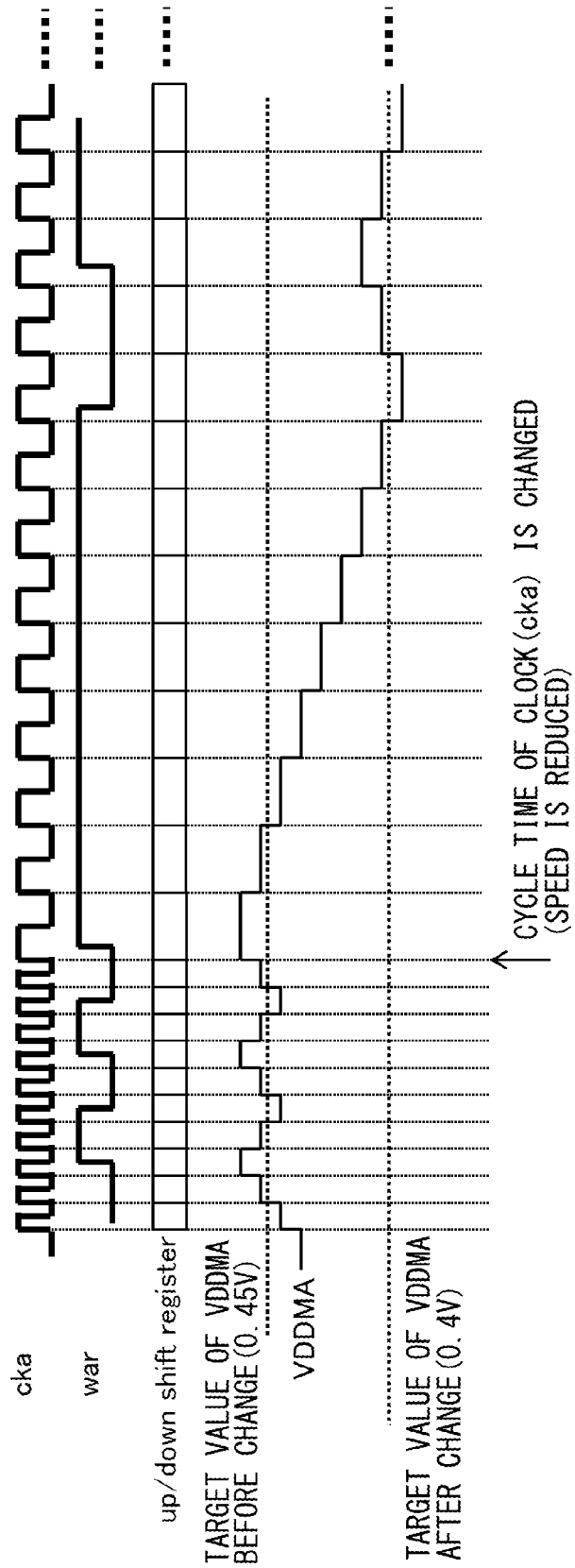
FIG. 28 is a time chart illustrating the operation of the controller in the case where the cycle time of the clock "cka" is increased in the first embodiment.

FIG. 28 is a time chart indicating the operation of the controller 42A in the case where the cycle time of the clock "cka" is increased from "CT2" to "CT1" in the LDO regulator 40 of the semiconductor device of the first embodiment.

Before the clock frequency is changed, the control of the LDO regulator 40 is performed on the assumption that, for example, the VDDMA of 0.45 V ("VDDMA"=0.45 V) is the target value, however, after the clock frequency is changed, the control of the LDO regulator 40 is performed on the assumption that, for example, the VDDMA of 0.40 V ("VDDMA"=0.4 V) is the target value after the change. When the LDO after the change is started, the operation changes to an operation to drop the VDDMA by decreasing the number of the turned-on supply transistors one by one.

Further, as illustrated in FIG. 28, in the operation during which the clock frequency increases, immediately after the clock frequency increases, there occurs a case where the VDDMA has not reached the target value yet and not entered the operable region of the circuit block 11. In this case, it is desirable to wait until the VDDMA reaches the target value, and therefore, there is a possibility that this causes a bottleneck of the system performance.

Consequently, immediately after the change is made so that the clock frequency increases, for example, by using the controller 42D of the fourth embodiment, all the outputs are reset to "0" when the change is made so that the clock frequency increases. Because of this, the time delay until the VDDMA reaches the target value is eliminated and it is unlikely that a bottleneck in the system performance is caused.

Figure 29:
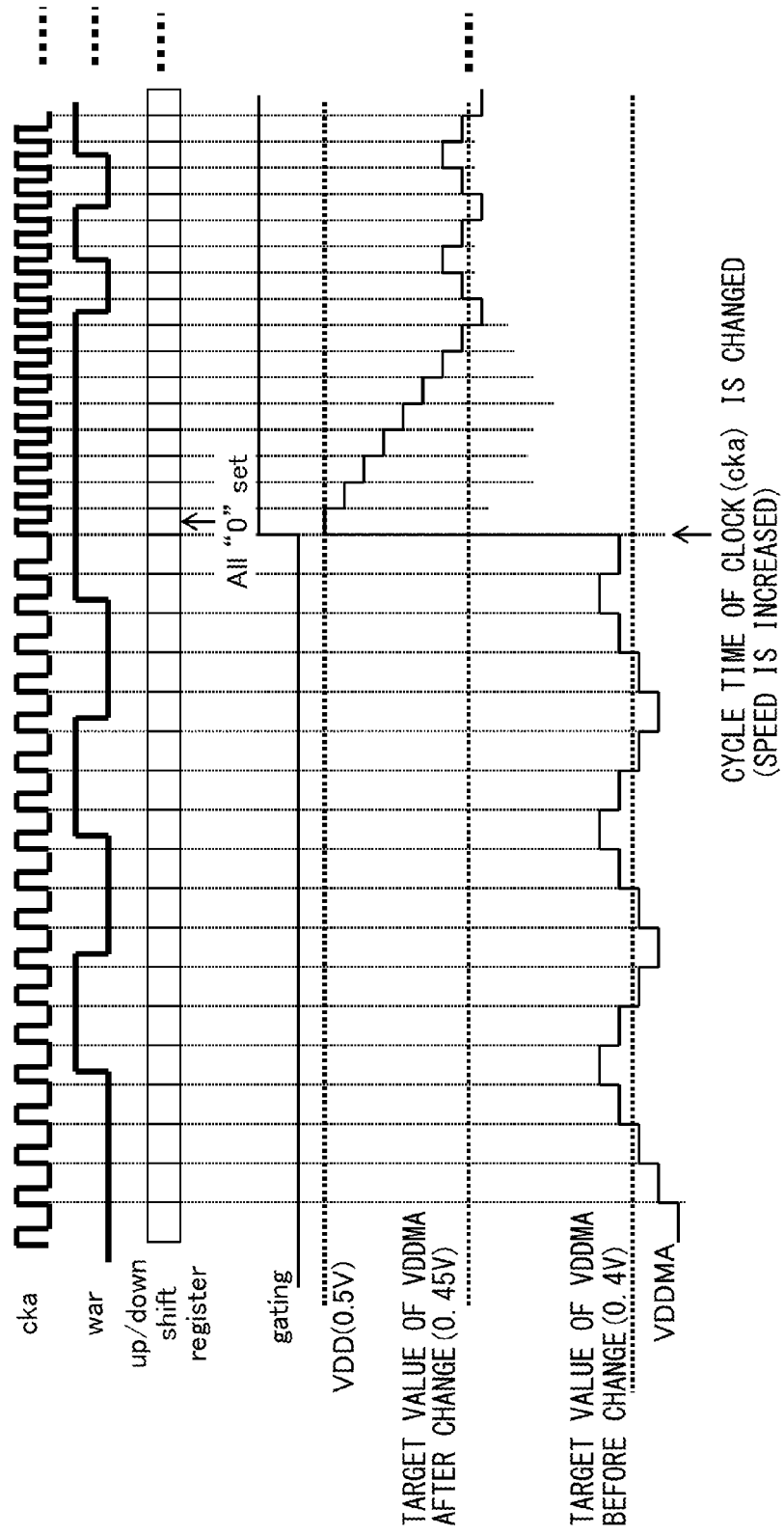
FIG. 29 is a time chart illustrating the operation of the controller in the case where the frequency of the clock "cka" is increased in the fourth embodiment.

FIG. 29 is a time chart illustrating the operation of the controller 42A in the case where the frequency of the clock "cka" is increased (the cycle time is reduced) in the LDO regulator 40 of the semiconductor device of the fourth embodiment.

As illustrated in FIG. 29, before the frequency is changed, as in FIG. 26, the control of the LDO regulator 40 is performed on the assumption that the VDDMA of 0.40 V ("VDDMA"=0.4 V) is the target value. In the case where the clock frequency is increased (the cycle time is shortened) on the way of the operation, by the transition from "0" to "1" of the gating signal gating, the VDDMA is raised once up to the power source voltage (0.5 V). After that, the control of the LDO regulator 40 is started so that the VDDMA approaches 0.45 V ("VDDMA"=0.45 V), which is the target value after the change, and the operation changes to an operation to drop the VDDMA by decreasing the number of the turned-on supply transistors one by one.

By performing the control as in FIG. 29, at the instant that the clock frequency is increased, the VDDMA rises up to the power source voltage VDD (0.5 V). Because of this, the VDDMA is already in the operable region of the circuit block 11 and there is no need to wait until the VDDMA reaches and settles at the target value, and therefore, the bottleneck of the system performance is not caused. In the case where the clock frequency is reduced, the VDDMA still remains in the operable region of the circuit block 11, and therefore, there is no need to perform processing other than that described in particular. That is, it is only desirable to increase the VDDMA once up to the power source voltage VDD (0.5 V) only at the instant the clock frequency is increased and at the time of transition from "0" to "1" of the gating signal "gating".

As above, the embodiments are explained, and it is also possible to, for example, combine the configurations of the different embodiments and by this, the advantages of both the embodiments that are combined are obtained. Further, in the third embodiment and the fourth embodiment, it may also be possible to integrate the enable signal enable and the gating signal gating into one control signal that functions as both.

In the embodiments explained as above, the need of the analog comparator circuit is obviated in the semiconductor device that mounts the LDO regulator to which the power source voltage is input from outside and which can vary the voltage to be supplied to the internal circuit. Consequently, the operation of the LDO regulator is enabled even under the low-voltage conditions of about 0.5 V, in which the power supply voltage is in the vicinity of the threshold value of the transistor. Further, in the embodiments, the large capacitor element to protect analog potentials to be compared from noise and the large resistor element to configure the variable voltage divider circuit are no longer provided, and therefore, the area occupied by the chip can be reduced.

Figure 4A:
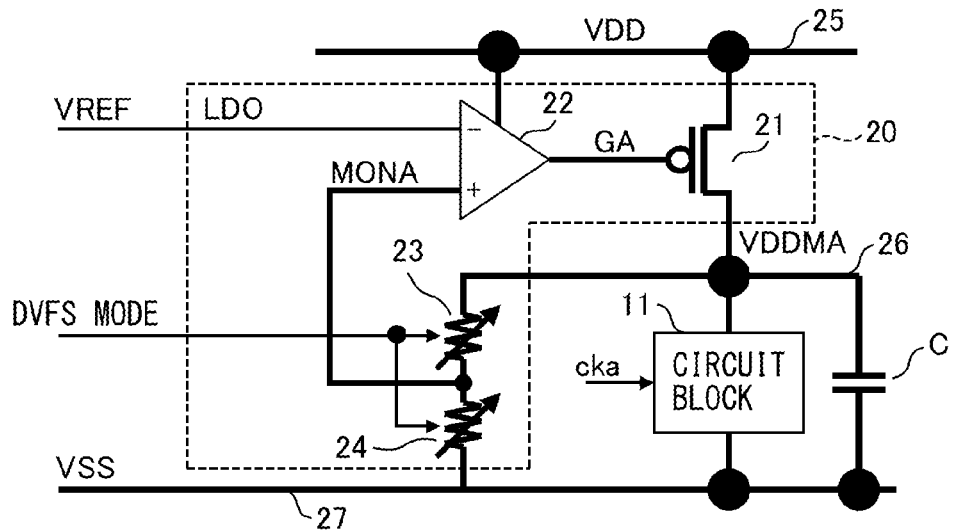
FIG. 4A and FIG. 4B are diagrams illustrating circuit examples of the LDO regulator proposed hitherto, also illustrating together circuit blocks to which the power source voltage is supplied from the LDO regulator.
Figure 4B:
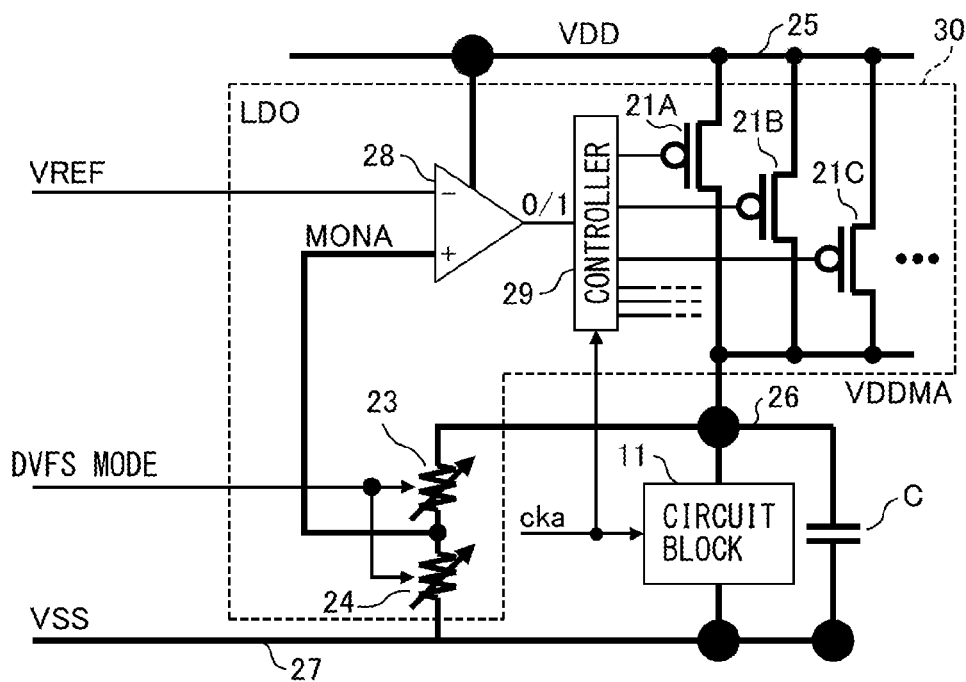

As explained above, when the VDD becomes a further lower voltage equal to or less than 0.5 V, the voltage enters the region where it is difficult for the comparator 28 to determine a slight difference between two potentials to be compared in the digital type LDO regulator in FIG. 4B, and therefore, a problem arises in that it is not possible to perform an accurate determination. Further, the capacitor element to protect the reference potential VREF for a potential comparison from noise and the resistor element to configure the voltage divider circuit are provided for both the analog type LDO regulator and the digital type LDO regulator, and this brings about such a problem that the area occupied by the chip increases.

In contrast, the semiconductor device of the embodiments accurately determine whether the voltage value of the local power source of each circuit part is higher or lower than the target voltage and accurately controls the plurality of discrete supply switches based on the determination result, and therefore, the DVFS technique is performed stably.

As above, according to the embodiments, the semiconductor that applies the DVFS technique and which accurately operates even if the VDD is as low as 0.5 V or less is implemented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
a plurality of circuit parts;
a global power source configured to supply a power source voltage supplied from outside;
a plurality of power source supply circuits configured to connect local power sources of the plurality of circuit parts and the global power source; and
a plurality of local power source control circuits provided in correspondence to the plurality of circuit parts and configured to control the plurality of power source supply circuits so that voltage values of the local power sources of the plurality of circuit parts are desired values, wherein
each of the plurality of power source supply circuits includes a plurality of discrete supply switches,
each of the plurality of local power source control circuits includes:
a delay monitor circuit having a delay path whose amount of delay changes in accordance with a change in the voltage value of the local power source, and whose output logical value changes in accordance with the amount of delay of the delay path; and
a switch control circuit configured to control the number of the plurality of discrete supply switches based on the output logical value of the delay monitor circuit.

2. The semiconductor device according to claim 1, wherein the delay path includes a simulated delay path based on a critical path delay that determines a limit operation frequency at which each circuit part operates normally.

3. The semiconductor device according to claim 2, wherein the delay monitor circuit has a determination circuit configured to determine whether the operation is normal in a case where a signal that changes depending on an operation frequency of the circuit part is delayed by the simulated delay path.

4. The semiconductor device according to claim 1, wherein the plurality of discrete supply switches is formed by a plurality of discrete MOS transistors.

5. The semiconductor device according to claim 1, wherein the switch control circuit performs control so as to increase the number of the turned-on discrete supply switches if the delay monitor circuit determines that the amount of delay of the delay path exceeds a normal amount of delay of the circuit part, and performs control so as to decrease the number of the plurality of the turned-on discrete supply switches if the delay monitor circuit determines that the normal amount of delay is not exceeded.

6. The semiconductor device according to claim 1, wherein the delay monitor circuit includes a first delay path and a second delay path whose amount of delay changes in accordance with a change in the voltage value of the local power source, wherein the amount of delay of the second delay path is larger than the amount of delay of the first delay path,
the delay monitor circuit outputs a first output whose logical value changes in accordance with the amount of delay of the first delay path, and a second output whose logical value changes in accordance with the amount of delay of the second delay path, and
the switch control circuit:
increases the number of the plurality of the turned-on discrete supply switches if both the first output and the second output indicate that the normal amount of delay is exceeded;
decreases the number of the plurality of the turned-on discrete supply switches if both the first output and the second output indicate that the normal amount of delay is not exceeded; and
maintains the number of the plurality of the turned-on discrete supply switches if the second output indicates that the normal amount of delay is exceeded but the first output indicates that the normal amount of delay is not exceeded.

7. The semiconductor device according to claim 1, wherein the switch control circuit turns off all the plurality of the discrete supply switches when stopping the supply of the local power source by stopping the corresponding circuit part, and turns on once all the plurality of the discrete supply switches when causing the corresponding circuit part to operate again.

8. The semiconductor device according to claim 1, wherein the switch control circuit turns on once all the plurality of the discrete supply switches when supplying the clock again after stopping the supply of clock to the corresponding circuit part.

9. The semiconductor device according to claim 1, wherein the supply of clock to the circuit part is stopped if the delay monitor circuit determines that the amount of delay of the delay path exceeds the normal amount of delay, and the supply of clock to the circuit part is resumed if the delay monitor circuit determines that the amount of delay of the delay path does not exceed the normal amount of delay.

10. The semiconductor device according to claim 1, wherein
all of the plurality of the discrete supply switches is turned on once if the frequency of the clock to be supplied to the circuit part is changed and the frequency of the clock to be supplied is changed so as to increase.

* * * * *